US010178428B2

(12) United States Patent
Ström et al.

(10) Patent No.: US 10,178,428 B2
(45) Date of Patent: Jan. 8, 2019

(54) VIDEO BITSTREAM PROCESSING FOR ENABLING TUNE-IN

(71) Applicant: Telefonaktiebolaget LM Ericsson (publ), Stockholm (SE)

(72) Inventors: Jacob Ström, Stockholm (SE); Beatriz Grafulla-González, Solna (SE); Richard Mitic, Sundbyberg (SE); Thomas Rusert, Kista (SE); Ying Wang, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 95 days.

(21) Appl. No.: 15/516,446

(22) PCT Filed: Oct. 7, 2014

(86) PCT No.: PCT/SE2014/051167
§ 371 (c)(1),
(2) Date: Apr. 3, 2017

(87) PCT Pub. No.: WO2016/056959
PCT Pub. Date: Apr. 14, 2016

(65) Prior Publication Data
US 2018/0234724 A1    Aug. 16, 2018

(51) Int. Cl.
*H04N 21/4335*    (2011.01)
*H04N 21/4402*    (2011.01)
(Continued)

(52) U.S. Cl.
CPC ..... *H04N 21/4335* (2013.01); *H04N 21/4325* (2013.01); *H04N 21/4402* (2013.01);
(Continued)

(58) Field of Classification Search
CPC combination set(s) only.
See application file for complete search history.

(56) References Cited

U.S. PATENT DOCUMENTS

2004/0001694 A1    1/2004  Evans et al.
2005/0081244 A1*   4/2005  Barrett .............. H04L 12/185
                                                725/97
(Continued)

FOREIGN PATENT DOCUMENTS

WO          99/57724 A1    11/1999
WO      2013/109178 A1     7/2013

OTHER PUBLICATIONS

International Search Report and Written Opinion issued in corresponding International Application No. PCT/SE2014/051167 dated Jun. 5, 2015, 11 pages.

*Primary Examiner* — Alexander Gee
(74) *Attorney, Agent, or Firm* — Rothwell, Figg, Ernst & Manbeck, p.c.

(57) ABSTRACT

Chunks (12, 14) of encoded video data of a streamed video bitstream (1) are stored and encoded video data is decoded to form decoded video data to be output for display. A selected portion (12) of the stored chunks (12, 14) or selected sub-chunks (25, 27) of the stored chunks (20, 22) for a previous, already played out part (3) of the streamed video bitstream (1) is or are discarded while keeping selected stored chunks (14) or selected sub-chunks (21, 23) stored as navigation tune-in points. The usage of selected stored chunks (14) or sub-chunks (21, 23) that are not discarded from the already played out part (3) of the streamed video bitstream (1) enables a low delay solution during video navigation when a user wants to jump to a previously played out position (5) within the streamed video bitstream (1).

40 Claims, 7 Drawing Sheets

(51) Int. Cl.
*H04N 21/845* (2011.01)
*H04N 21/432* (2011.01)
*H04N 21/6587* (2011.01)

(52) U.S. Cl.
CPC . *H04N 21/440263* (2013.01); *H04N 21/6587* (2013.01); *H04N 21/8453* (2013.01); *H04N 21/8456* (2013.01)

(56) References Cited

U.S. PATENT DOCUMENTS

| | | | |
|---|---|---|---|
| 2007/0058926 A1* | 3/2007 | Virdi | H04N 5/783 386/231 |
| 2008/0147910 A1* | 6/2008 | Hibbard | G06F 3/0616 710/29 |
| 2009/0158326 A1* | 6/2009 | Hunt | G06F 3/04817 725/38 |
| 2009/0204812 A1* | 8/2009 | Baker | H04L 65/607 713/160 |
| 2010/0086280 A1* | 4/2010 | Sabo | H04N 5/783 386/343 |
| 2010/0153574 A1* | 6/2010 | Lee | H04L 12/1827 709/231 |

* cited by examiner

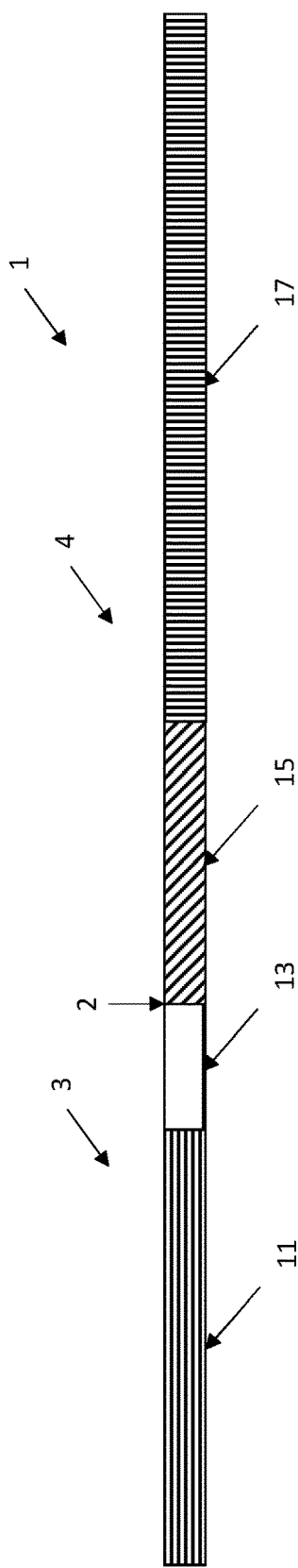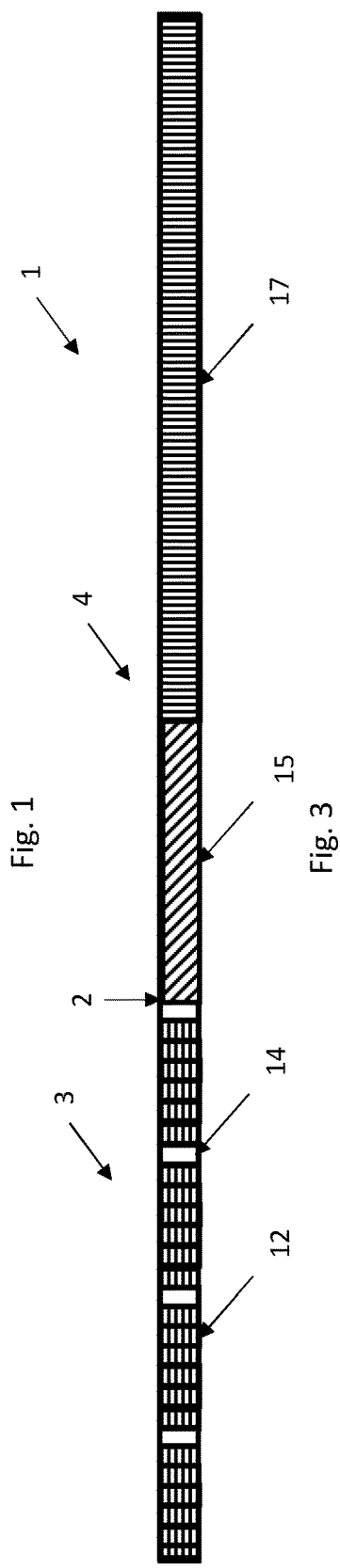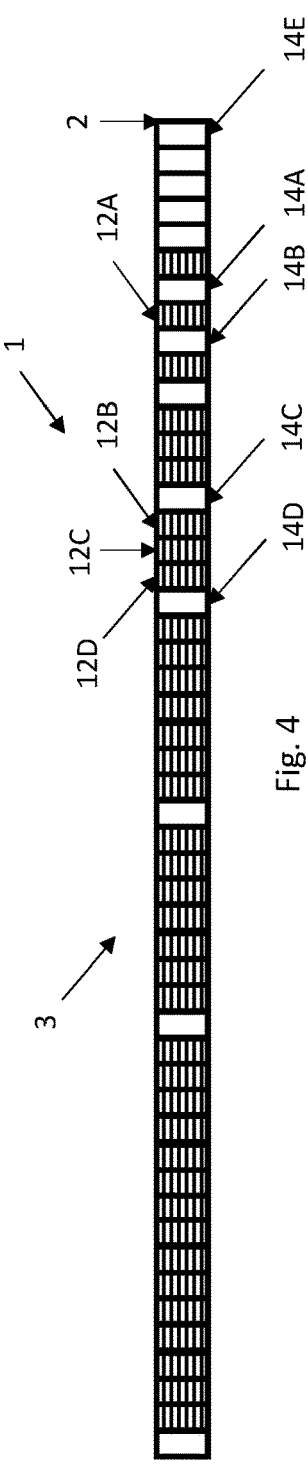
Fig. 1
Fig. 3
Fig. 4

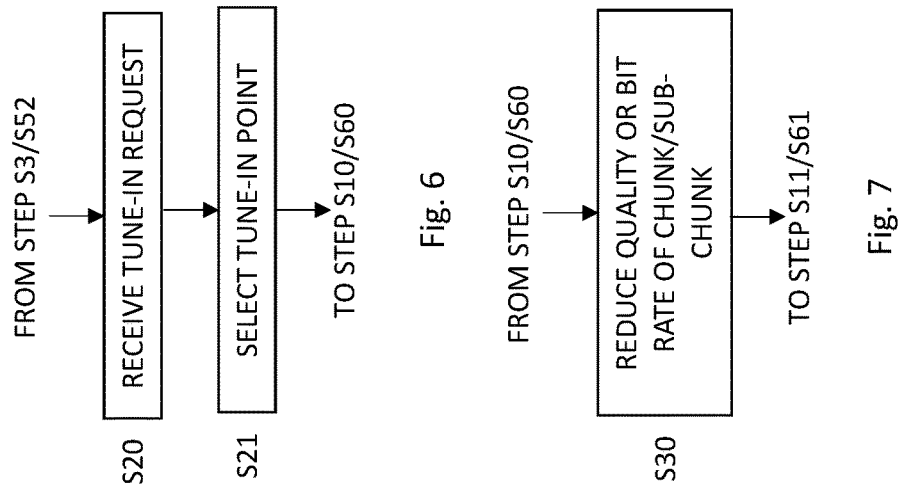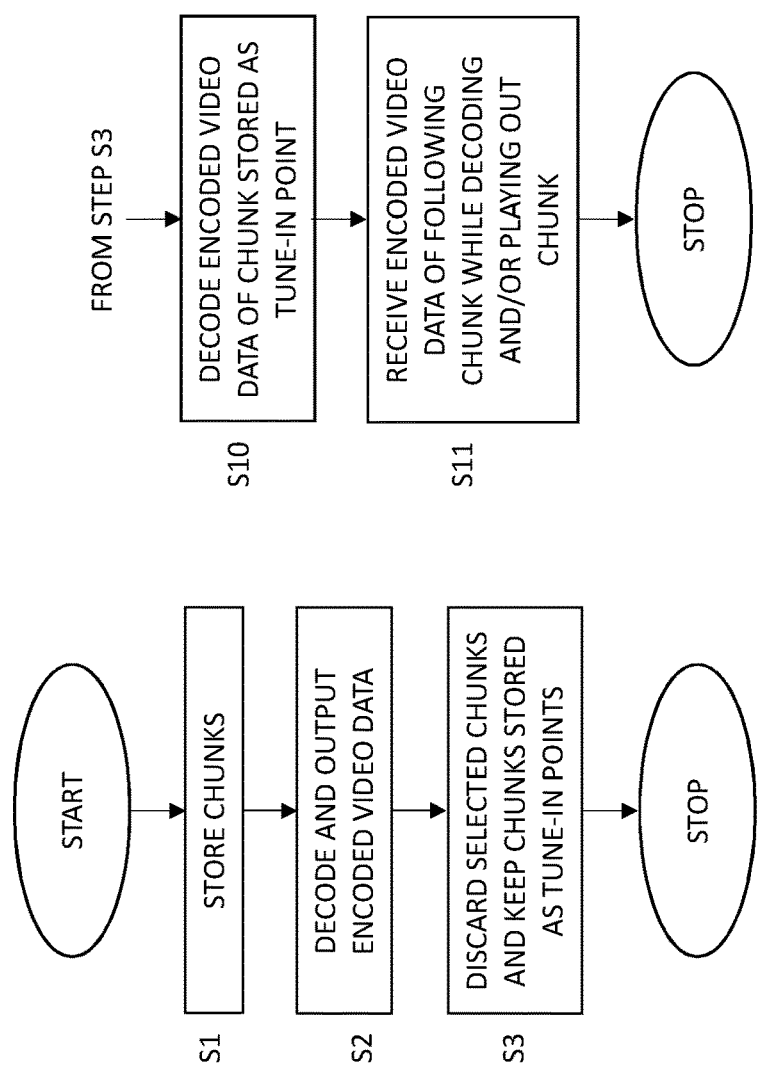

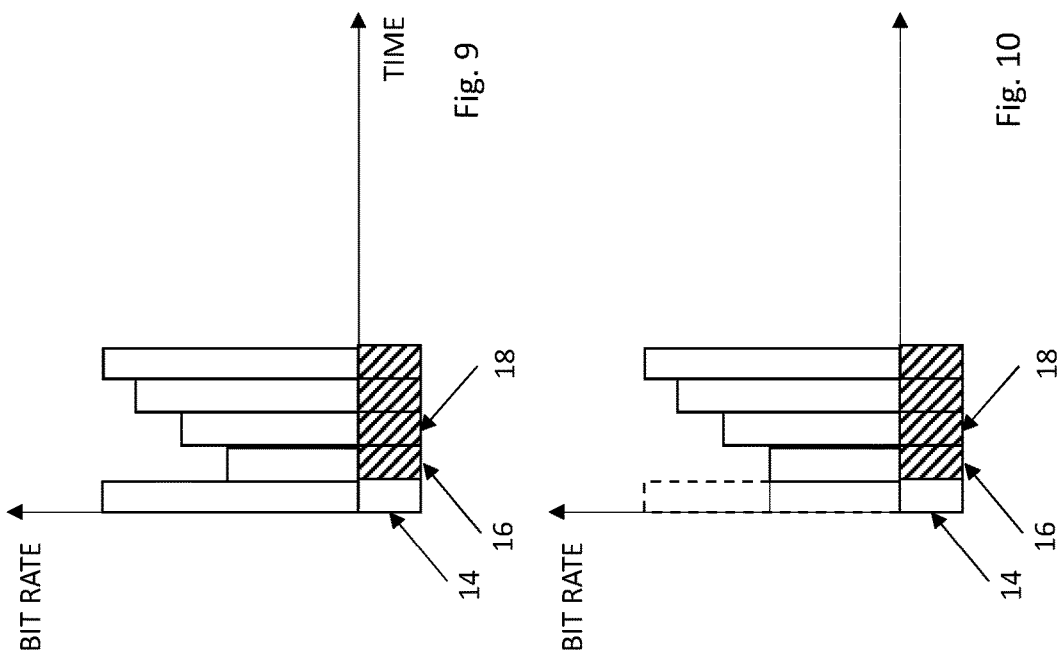
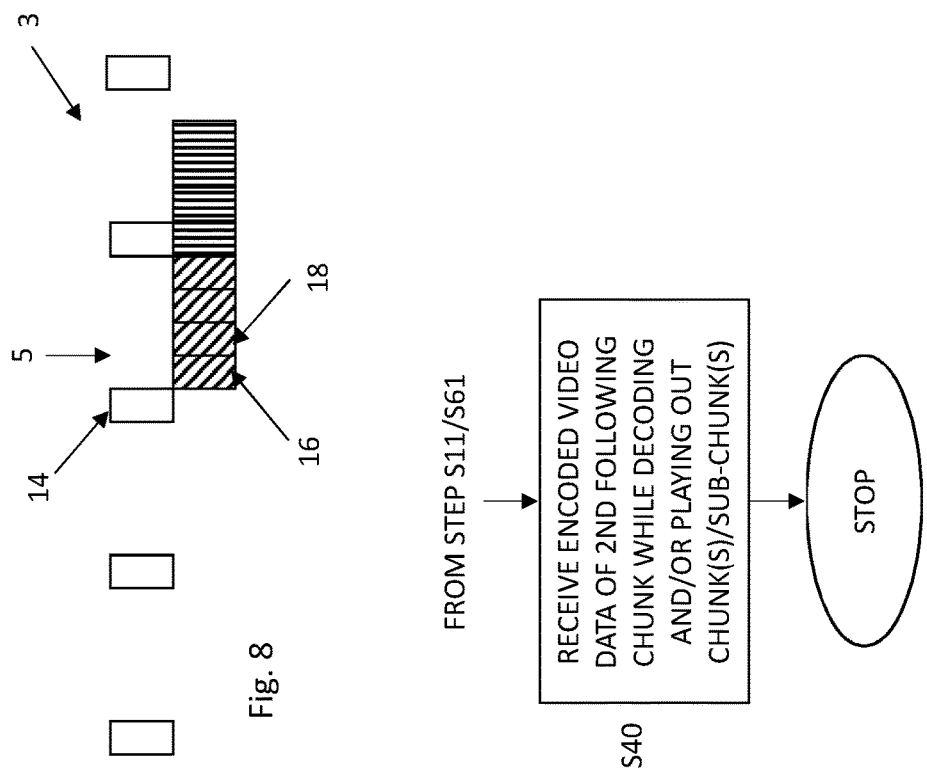

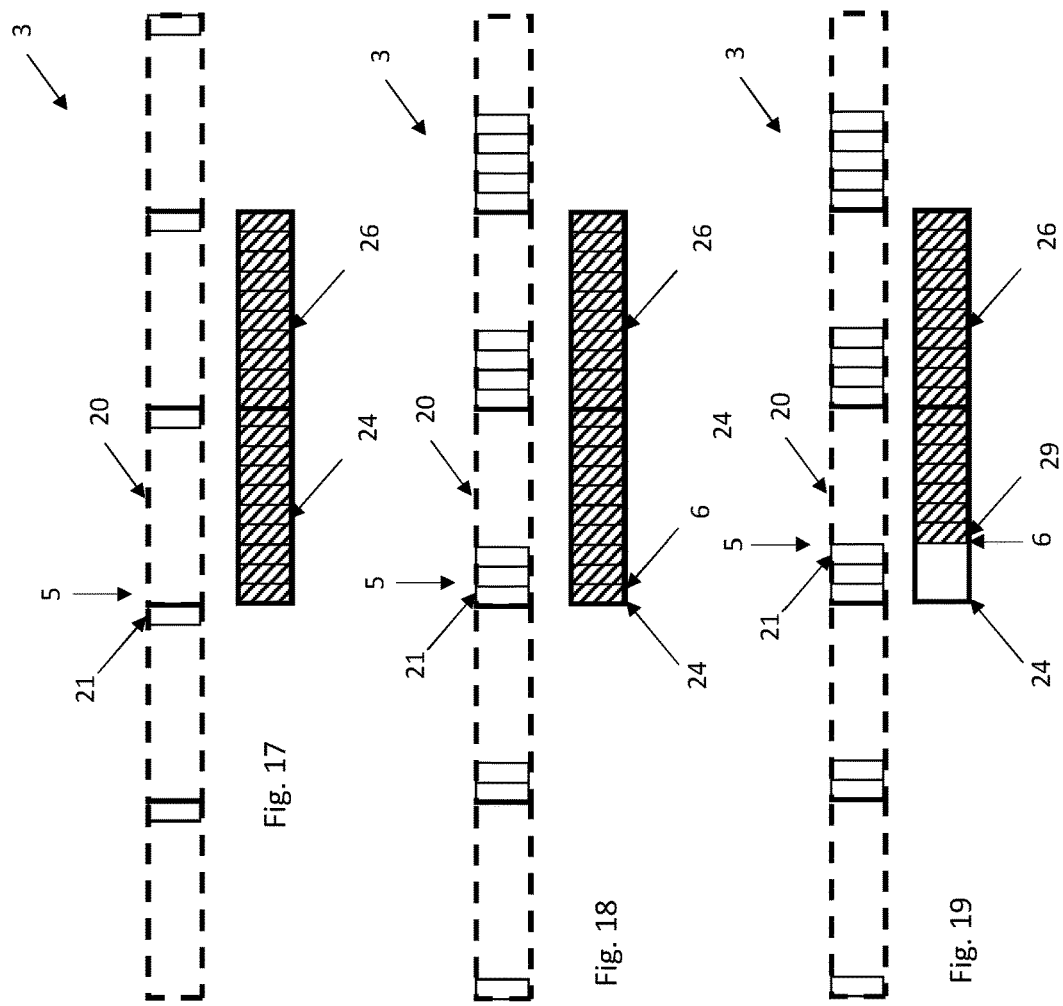
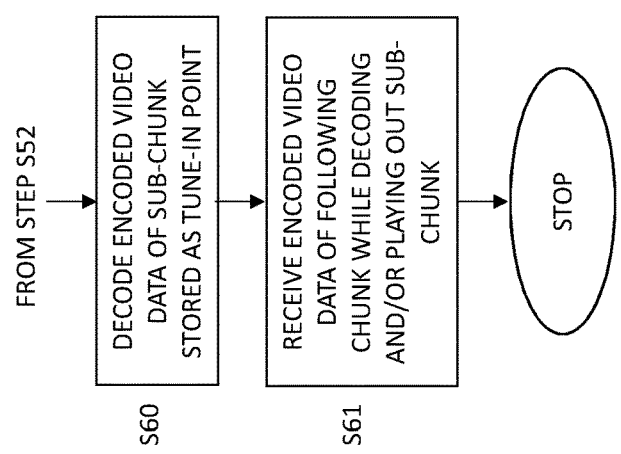

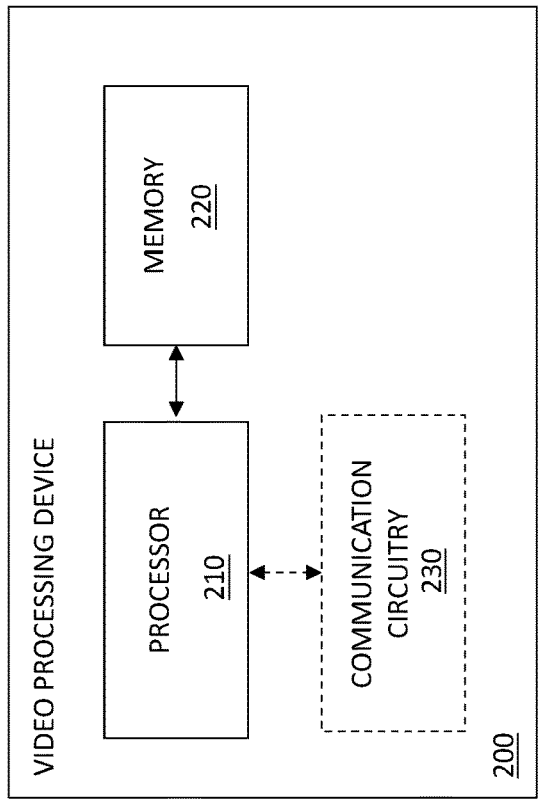
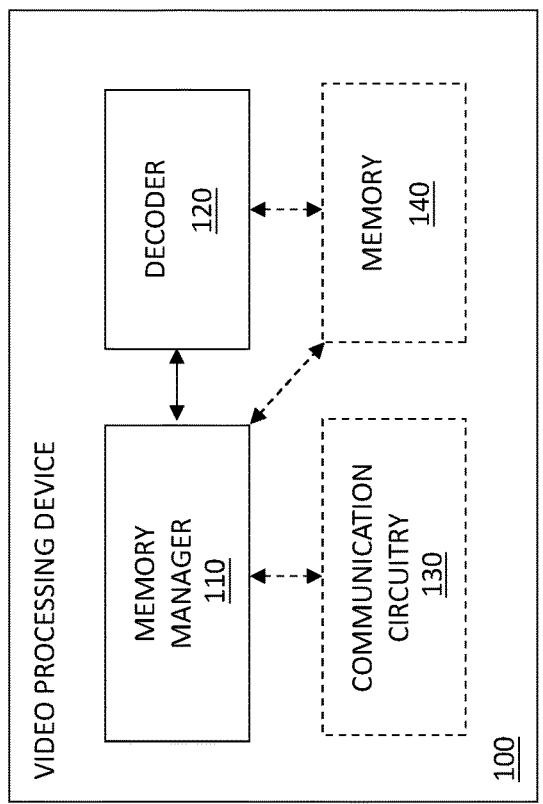
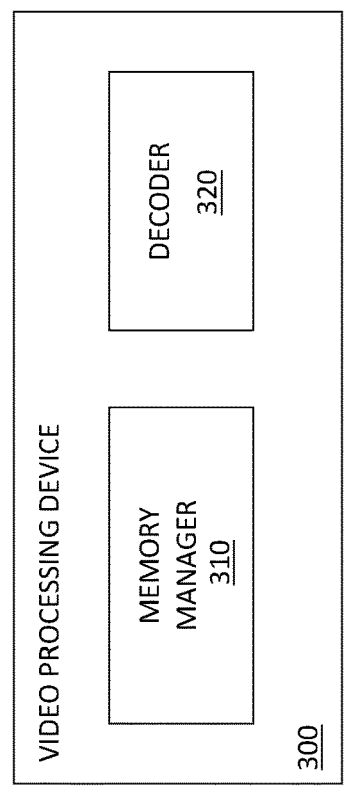
Fig. 20
Fig. 21
Fig. 22

VIDEO BITSTREAM PROCESSING FOR ENABLING TUNE-IN

CROSS REFERENCE TO RELATED APPLICATION(S)

This application is a 35 U.S.C. § 371 National Stage of International Patent Application No. PCT/SE2014/051167, filed Oct. 7, 2014, designating the United States, the disclosure of which is incorporated by reference.

TECHNICAL FIELD

The present embodiments generally relate to processing of streamed video bitstreams, and in particular to tuning into an already played out part of a streamed video bitstream, such as during video navigation.

BACKGROUND

The radio-based communication networks of today are generally good enough for supporting video streaming, at least with regard to devices with small screens, such as smart phones. For instance, the resolution of the retina screen in iPhone 5S is 1136×640 pixels, which can be supported in terms of video streaming over a Long Term Evolution (LTE) network.

While current solutions may work well for linear play out or playback, the same is not true for video navigation, i.e. when the user moves the video cursor to another part of the streamed video bitstream. As an example, if the user wants to jump twenty minutes ahead in a Netflix movie, the video data at this position is not available at the user's video player. The video player must first request the video data at this position from the Netflix movie server. However, even after receiving the first few frames or pictures at this position, the play out of video data is still not started. The reason for this is that a video player typically needs to build up a buffer of video data before starting to play out the video. This buffering of video data is needed since the network bandwidth can be choppy and suddenly drop. The video player then wants to build up a sufficiently large buffer before starting the play out to be sure not to deplete the buffer if the bit rate would suddenly drop, which would cause the video player to freeze the video play out.

Video navigation backwards in time, i.e. to a previous, already played out position within the streamed video bitstream, generally denoted rewinding in the art, does not work well with current technology. For some video applications, such as Netflix running on Playstation 3 (PS3), rewinding is possible to a position 30 s backwards in time by pushing the "left" button on the remote control once. Pushing the "left" button twice triggers rewinding to a position 1 min backwards in time. However, if the "left" button is pushed more than twice to jump even further backwards in the already played out part of the streamed video bitstream then a same request and buffering procedure takes place as when jumping ahead in time. This means that there will be a significant delay from jumping back in time by pressing the "left" button until the play out is resumed.

Thus, there is a need for an efficient solution of tuning into a streamed video bitstream, such as during video navigation when the user moves to a previous, already played out part of the streamed video bitstream. It is particularly a need for such a solution that reduces the delay before the video play out is resumed following video navigation.

SUMMARY

It is a general objective to provide an efficient solution of tuning into a streamed video bitstream, such as during video navigation.

This and other objectives are met by embodiments as described herein.

An aspect of the embodiments relates to a video processing method. The video processing method comprises storing chunks of encoded video data of a streamed video bitstream. The streamed video bitstream is partitioned into multiple chunks where each chunk of the multiple chunks starts with an independently decodable picture. The video processing method also comprises decoding encoded video data of the streamed video bitstream to form decoded video data to be output for display. The video processing method further comprises discarding a selected portion of the stored chunks for a previous, already played out part of the streamed video bitstream while keeping selected stored chunks for the previous, already played out part of the streamed video bitstream stored as output time non-adjacent navigation tune-in points distributed throughout the previous, already played out part of the streamed video bitstream.

Another aspect of the embodiments relates to a video processing method. The video processing method comprises storing chunks of encoded video data of a streamed video bitstream. The streamed video bitstream is partitioned into multiple chunks where each chunk of the multiple chunks starts with an independently decodable picture. The video processing method also comprises decoding encoded video data of the streamed video bitstream to form decoded video data to be output for display. The video processing method further comprises discarding selected sub-chunks of encoded video data of the stored chunks for a previous, already played out part of the streamed video bitstream while keeping, stored as navigation tune-in points, selected sub-chunks of encoded video data for the previous, already played out part of the streamed video bitstream. Each sub-chunk corresponds to a sub-portion of a chunk and starts with an independently decodable picture. A play out duration of each sub-chunk is shorter than a play out duration of the chunks.

A further aspect of the embodiment relates to a video processing device. The video processing device is configured to store chunks of encoded video data of a streamed video bitstream. The streamed video bitstream is partitioned into multiple chunks where each chunk of the multiple chunks starts with an independently decodable picture. The video processing device is also configured to decode encoded video data of the streamed video bitstream to form decoded video data to be output for display. The video processing device is further configured to discard a selected portion of the stored chunks for a previous, already played out part of the streamed video bitstream while keeping selected stored chunks for the previous, already played out part of the streamed video bitstream stored as output time non-adjacent navigation tune-in points distributed throughout the previous, already played out part of the streamed video bitstream.

A related aspect of the embodiments defines a video processing device. The video processing device comprises a memory manager for storing chunks of encoded video data of a streamed video bitstream. The streamed video bitstream is partitioned into multiple chunks where each chunk of the multiple chunks starts with an independently decodable picture. The video processing device also comprises a decoder for decoding encoded video data of the streamed video bitstream to form decoded video data to be output for display. The memory manager is also for discarding a selected portion of the stored chunks for a previous, already played out part of the streamed video bitstream while keeping selected stored chunks for the previous, already played out part of the streamed video bitstream stored as output time non-adjacent navigation tune-in points distributed throughout the previous, already played out part of the streamed video bitstream.

Yet another aspect of the embodiment relates to a video processing device. The video processing device is configured to store chunks of encoded video data of a streamed video bitstream. The streamed video bitstream is partitioned into multiple chunks where each chunk of the multiple chunks starts with an independently decodable picture. The video processing device is also configured to decode encoded video data of the streamed video bitstream to form decoded video data to be output for display. The video processing device is further configured to discard selected sub-chunks of encoded video data of the stored chunks for a previous, already played out part of the streamed video bitstream while keeping, stored as navigation tune-in points, selected sub-chunks of encoded video data for the previous, already played out part of the streamed video bitstream. Each sub-chunk corresponds to a sub-portion of a chunk and starts with an independently decodable picture. A play out duration of each sub-chunk is shorter than a play out duration of the chunks.

A related aspect of the embodiments defines a video processing device. The video processing device comprises a memory manager for storing chunks of encoded video data of a streamed video bitstream. The streamed video bitstream is partitioned into multiple chunks where each chunk of the multiple chunks starts with an independently decodable picture. The video processing device also comprises a decoder for decoding encoded video data of the streamed video bitstream to form decoded video data to be output for display. The memory manager is also for discarding selected sub-chunks of encoded video data of the stored chunks for a previous, already played out part of the streamed video bitstream while keeping, stored as navigation tune-in points, selected sub-chunks of encoded video data for the previous, already played out part of the streamed video bitstream. Each sub-chunk corresponds to a sub-portion of a chunk and starts with an independently decodable picture. A play out duration of each sub-chunk is shorter than a play out duration of the chunks.

A further aspect of the embodiments relates to a computer program comprising instructions, which when executed by a processor, cause the processor to store chunks of encoded video data of a streamed video bitstream partitioned into multiple chunks. Each chunk of the multiple chunks starts with an independently decodable picture. The processor is also caused to decode encoded video data of the streamed video bitstream to form decoded video data to be output for display. The processor is further caused to discard a selected portion of the stored chunks for a previous, already played out part of the streamed video bitstream while keeping selected stored chunks for the previous, already played out part of the streamed video bitstream stored as output time non-adjacent navigation tune-in points distributed throughout the previous, already played out part of the streamed video bitstream.

Yet another aspect of the embodiments relates to a computer program comprising instructions, which when executed by the processor, cause the processor to store chunks of encoded video data of a streamed video bitstream partitioned into multiple chunks. Each chunk of the multiple chunks starts with an independently decodable picture. The processor is also caused to decode encoded video data of the streamed video bitstream to form decoded video data to be output for display. The processor is further caused to discard selected sub-chunks of encoded video data of the stored chunks for a previous, already played out part of the streamed video bitstream while keeping, stored as navigation tune-in points, selected sub-chunks of encoded video for the previous, already played out part of the streamed video bitstream. Each sub-chunk corresponds to a sub-portion of a respective chunk and starts with an independently decodable picture and a play out duration of each sub-chunk is shorter than a play out duration of the respective chunks.

A related aspect of the embodiments defines a carrier comprising a computer program as defined above. The carrier is one of an electronic signal, an optical signal, an electromagnetic signal, a magnetic signal, an electric signal, a radio signal, a microwave signal, or a computer-readable storage medium.

The present embodiments provide an efficient solution to tuning into an already played out part of a streamed video bitstream, such as during video navigation. In particular, the embodiments enable a quicker start-up of video decoding and play out following a tune-in or video navigation as compared to prior art solutions requiring downloading, decoding and buffering quite an amount of video data before the play out is started following a video navigation.

BRIEF DESCRIPTION OF THE DRAWINGS

The embodiments, together with further objects and advantages thereof, may best be understood by making reference to the following description taken together with the accompanying drawings, in which:

FIG. 1 illustrates a streamed video bitstream processed according to prior art technology;

FIG. 2 is a flow chart illustrating a video processing method according to an embodiment;

FIG. 3 illustrates a streamed video bitstream processed according to an embodiment;

FIG. 4 illustrates a played out part of a streamed video bitstream processed according to an embodiment;

FIG. 5 is a flow chart illustrating additional, optional steps of the method shown in FIG. 2;

FIG. 6 is a flow chart illustrating additional, optional steps of the method shown in FIGS. 2 and 12;

FIG. 7 is a flow chart illustrating an additional, optional step of the method shown in FIGS. 5 and 16;

FIG. 8 schematically illustrates navigation into a played out part of a streamed video bitstream according to an embodiment;

FIG. 9 schematically illustrates increasing quality or bit rate in chunks following navigation into a played out part of a streamed video bitstream according to an embodiment;

FIG. 10 schematically illustrates increasing quality or bit rate in chunks following navigation into a played out part of a streamed video bitstream according to another embodiment;

FIG. 11 is a flow chart illustrating an additional, optional step of the method shown in FIGS. 5 and 16;

FIG. 16 is a flow chart illustrating additional, optional steps of the method shown in FIG. 12;

FIG. 17 schematically illustrates navigation into a played out part of a streamed video bitstream according to another embodiment;

FIG. 18 schematically illustrates navigation into a played out part of a streamed video bitstream according to a further embodiment;

FIG. 19 schematically illustrates navigation into a played out part of a streamed video bitstream according to yet another embodiment;

FIG. 20 schematically illustrates a video processing device according to an embodiment;

FIG. 21 schematically illustrates a video processing device according to another embodiment;

FIG. 22 schematically illustrates a video processing device according to a further embodiment.

DETAILED DESCRIPTION

Figure 13:
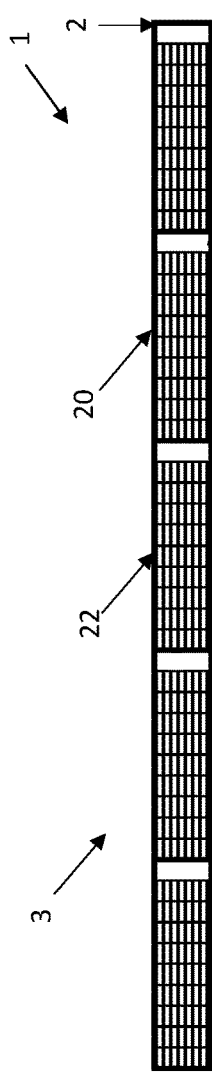
FIG. 13 illustrates a played out part of a streamed video bitstream processed according to another embodiment.

Throughout the drawings, the same reference numbers are used for similar or corresponding elements.

The present embodiments generally relate to processing of streamed video bitstreams. In particular, the embodiments relate to tuning into an already played out or played back part of a streamed video bitstream, such as during video navigation.

Video navigation as used herein refers to the process where a user moves from playing out or back one part of a video stream to playing out or back another part of the video bitstream. For instance, the user may want to jump back in time to resume video play out from a previous scene in a movie. The present embodiments then provide a solution that reduces the delay before the video play out is resumed following video navigation.

A streamed video bitstream of the embodiments comprises encoded video data partitioned into multiple chunks of encoded video data. Each such chunk starts with an independently decodable picture. Such an independently decodable picture is also referred to as intra-coded picture (I-picture) or intra-coded frame (I-frame) in the art. Independently decodable picture means that the picture can be decoded without reference to any reference pictures. Such an independently decodable picture may be used as random access point (RAP) to start decoding and playing out video.

The chunk may comprise at least one further independently decodable pictures in addition to the independently decodable picture at the start of the chunk.

Chunks constitute a way of partitioning the streamed video bitstream into smaller parts of encoded video data. For instance, Apple's HTTP Live Streaming (HLS) recommends organizing encoded video data of a streamed video bitstream into media segments of, for instance, 10 s of video data. Accessing one such 10 s segment is, thus, simple since it is a matter of requesting the correct file. Correspondingly, dynamic adaptive streaming over HTTP (DASH) uses segments of encoded video, where each such segment is associated with an HTTP uniform resource locator (URL) and optionally a byte range that is specified by a media presentation description (MPD). Hence, a start of a chunk in DASH is identifiable by information in the MPD that could be regarded as a pointer into tune-in positions within the DASH-complied video bitstream. A video bitstream could consist of one or more DASH segments. A DASH segment may in turn consist of one or more fragments. The ISO base media file format also uses segments to divide an ISO base media file format file into smaller parts. Such a segment then either consists of a movie box with its associated media data and other associated boxes or one or more movie fragment boxes with their associated media data and other associated boxes.

The play out durations of the chunks are preferably the same, such as about 10 s of video data in the case of HLS segments. In an alternative embodiment, play out duration does not need to be the same for all chunks implying that different chunks could have different play out durations.

Hence, chunk as used herein refers to any partitioning, division, fragmentation or segmentation of a video bitstream into smaller parts or segments and where each such part or segment starts with an independently decodable picture. The above mentioned examples of media segments in HLS, segments in DASH, parts of a segment in DASH, one or more fragments in DASH and segments in ISO base media file format are regarded as chunks as used herein.

Furthermore, sub-chunk as used herein denotes, as the term indicated, a sub-portion of a chunk of the streamed video bitstream. This means that the play out duration of the encoded video data in the sub-chunk is shorter than the play out duration of the encoded video data in the chunk. For instance, if the chunk contains encoded video data that corresponds to a play out duration of about 10 s, such as adapted for HLS, then a sub-chunk may, as an illustrative but non-limiting example, contain encoded video data corresponding to a play out duration of about 1 s or 2 s. A chunk thereby comprises multiple, i.e. at least two, sub-chunks.

The sub-chunk preferably starts, in correspondence with each chunk, with an independently decodable picture. This means that decoding of encoded video data of the streamed video bitstream can be started at the start of the sub-chunk, which thereby functions as a tune-in point or RAP within the streamed video bitstream.

FIG. 1 schematically illustrates a streamed video bitstream 1 processed according to prior art technology. The figure schematically illustrates an already played out part 3 of the streamed video bitstream 1, a current play out position 2 within the streamed video bitstream 1 and a not yet played out part 4 of the streamed video bitstream 1. Play out position and output time or output position are used interchangeably herein. The not yet played out part 4 of the streamed video bitstream 1 consists of encoded video data 17 that has not yet been received and buffered at the video player and encoded data 15 that has been received and stored in the buffer at the video player. This buffered but not yet played out part 15 of the streamed video bitstream 1 is, thus, not yet decoded and output for display. As mentioned in the background section, video players build up a sufficiently large buffer of video data to reduce the risk of depleting the buffer during play out if the bit rate should suddenly drop.

Some video players and applications keep an already played out part 13 of the streamed video bitstream 1 cached or stored in a memory. However, as more and more video data is played out and as time progresses the played out and cached video data is removed from the memory. Hence, reference number 11 indicates an already played out and removed, i.e. non-cached/non-stored, part of the streamed video bitstream 1.

Rewinding and video navigation to an already played part 3 of the streamed video bitstream 1 as shown in FIG. 1 will have different outcomes depending on to which position the user would like to navigate. Thus, if the user would like to jump back 30 s in time the relevant encoded video data at this navigation tune-in point may be available and cached at the video player, i.e. corresponding to the part 13 of the streamed video bitstream 1. The decoding and play out can thereby be initiated directly without any need for requesting and buffering encoded video data. However, if the user would like to navigate further backwards in time to a navigation tune-in point in the part 11 of the streamed video bitstream 1, the encoded video data at this navigation tune-in point is not available at the video player. Hence, the video player has to request the encoded video data from the video server or provider and build up a sufficiently large buffer before the decoding and play out at the navigation tune-in point can be started. This leads to an annoying delay during video navigation.

The present embodiments reduce the delay experienced during video navigation according to prior art techniques. In particular, the present embodiments enable a consistent short delay, if any, from selecting a navigation tune-in point until play out of the video data is initiated.

FIG. 2 is a flow chart illustrating a video processing method according to an embodiment. The method comprises storing, in step S1, chunks of encoded video data of a streamed video bitstream. The streamed video bitstream is partitioned into multiple chunks where each chunk of the multiple chunks starts with an independently decodable picture. A next step S2 comprises decoding encoded video data of the streamed video bitstream to form decoded video data to be output for display. Step S3 comprises discarding a selected portion of the stored chunks for a previous, already played out part of the streamed video bitstream while keeping selected stored chunks for the previous, already played out part of the streamed video bitstream stored as output time non-adjacent navigation tune-in points distributed throughout the previous, already played out part of the streamed video bitstream.

Thus, as chunks are received for decoding they are stored or cached in step S1 in a memory to thereby be available during the decoding process. The decoding process involves decoding, in step S2, the encoded video data to form decoded video data that can be output for display. In the decoding process, decoded pictures are temporarily stored in a decoded picture buffer, where they are available for output for display at the correct output time and/or available as reference pictures when decoding a following, according to the decoding order, picture in the streamed video bitstream.

Generally, pictures are discarded from the memory once they have been decoded and entered the decoded picture buffer. The reason being that they are no longer needed during the decoding process and thereby only occupies memory.

However, the present embodiments as represented by step S3 do not discard all stored chunks for the previous, already played out part of the streamed video bitstream. In clear contrast, step S3 comprises discarding only a selected portion of the stored chunks for the previous, already played out part of the streamed video stream. This also implies that other selected stored chunks are kept stored for the previous, already played out part of the streamed video bitstream. These chunks that are selectively kept stored in the memory can thereby be used as navigation tune-in points if the user subsequently would like to jump in to an already played out part of the streamed video bitstream.

According to the embodiments the selected chunks that are kept stored in step S3 are stored as output time non-adjacent navigation tune-in points that are distributed throughout the previous, already played out part of the streamed video bitstream. This means that not all of the selected chunks kept stored as navigation tune-in points correspond to the most previous 30 s or 1 min of played out video as shown in FIG. 1. In clear contrast, the chunks kept stored in step S3 are distributed throughout the previous, already played out part of the streamed video bitstream. This implies that the chunks kept stored following the discarding operation in step S3 will be output time non-adjacent navigation tune-in points. Output time non-adjacent implies herein that not all chunks kept stored as navigation tune-in points have adjacent output times. For instance, the chunks of a streamed video bitstream could have respective output times represented by an output time parameter with increasing values. Thus, a first chunk has output time 0, a second chunk has output time 1, and so on. A chunk having output time n is regarded to be output adjacent to another chunk having output time n+1 or n−1.

In the above simplified example, it was assumed that output time increased by one for each chunk in the streamed video bitstream. This should, however, merely be seen as an illustrative example. Generally the output time is increased by the play out duration of a chunk, which may of course be different from 1 s. For instance, a chunk n having output time $t_n$ and play out duration $d_n$ is output time adjacent to a chunk having output time $t_n+d_n$ and output time adjacent to a chunk having output time $t_n-d_{n-1}$ and play out duration $d_{n-1}$.

Output time of a chunk generally represents the output time of the start of the chunk, although it alternatively could be some other predefined position within the chunk, such as the end of the chunk.

Chunks within the streamed video bitstream could be numbered, such as chunk number 0, chunk number 1, and so on. A chunk number n is then output time adjacent to a chunk number n+1 and a chunk number n−1.

The output time non-adjacent navigation tune-in points constituted by the selected chunks kept stored in step S3 while discarding other chunks are thereby output time separated to be distributed throughout the previous, already played out part of the streamed video bitstream.

Note that the selective discarding of a portion of the stored chunks in step S3 while keeping selected stored chunks as output time non-adjacent navigation tune-in points does not necessarily mean that all chunks kept stored need to be output time non-adjacent. As is further described herein, it could be possible to keep storing the chunks containing the last X s of already played out video data for some value of X, in addition to keep storing distributed chunks in the already, played out part of the streamed video bit stream. Such an example is further discussed herein with reference to FIG. 4.

In an embodiment, step S3 of FIG. 2 comprises discarding at least one stored chunk for the previous, already played out part of the streamed video bitstream while keeping, as navigation tune-in point, at least one selected stored chunk preceding, according the output time, the at least one stored chunk to be discarded and keeping, as navigation tune-in point, at least one selected stored chunk following, according to the output time, the at least one stored chunk to be discarded.

Hence, in this embodiment one of more of the stored chunks are discarded in step S3 to thereby obtain a gap in stored portion of the streamed video bitstream. This means that at least one chunk having an output time preceding the at least one discarded chunk of the gap and at least one chunk having an output time following the at least one discarded chunk are kept stored as navigation tune-in points.

In another or complementary embodiment, step S3 of FIG. 2 comprises discarding at least one stored chunk for the previous, already played out part of the streamed video bitstream while keeping, as navigation tune-in point at least one selected stored chunk preceding, according to the output time, the at least one stored chunk to be discarded and discarding at least one stored chunk preceding, according to the output time, the at least one selected stored chunk to be kept stored as navigation tune-in point.

FIG. 3 illustrates a streamed video bitstream 1 processed according to an embodiment. The streamed video bitstream 1 illustrates an already played out part 3, a current play out position 2, i.e. current output time or position, and a not yet played out part 4. In FIG. 3 but also throughout remaining figures showing a streamed video bitstream 1 or an already played out part 3 of a streamed video bitstream 1 vertical hatching indicates a not yet played out and not yet received part 17 of the streamed video bitstream 1, diagonal hatching indicates a not yet played out but received and stored part 15 of the streamed video bitstream 1, horizontal hatching indicates chunks 12 of an already played out part of the streamed video bitstream 1 that are selected to be discarded and the white parts represent chunks of an already played out part of the streamed video bitstream 1 that are selected to be kept stored as navigation tune-in points.

In the embodiment, shown in FIG. 3 step S3 of FIG. 2 comprises discarding the selected portion 12 of the stored chunks 12, 14 for the previous, already played out part 3 of the streamed video bitstream 1 while keeping, stored as navigation tune-in points, every $N^{th}$ stored chunk 14 for the previous, already played out part 3 of the streamed video bitstream 1. In this embodiment N is an integer equal to or larger than 2.

As shown in FIG. 3, in this embodiment there is a periodicity among the stored chunks 14 selected to be kept stored as navigation tune-in points and thereby also among the stored chunks 12 selected to be discarded in step S3.

The value of the parameter N could be fixed and used by all video players or decoders. Alternatively, the parameter N could be determined by the video player or decoder itself, such as based on some input parameter, such available memory. Another input parameter that alternatively or in addition could be used is the play out duration of the chunks so that the navigation tune-in points become distributed with a sufficient small gap of discarded chunks 14 therebetween.

For instance, the streamed video bitstream 1 could be divided into 1 s chunks or segments 12, 14. In such a case, every $10^{th}$ of the already played chunks 14 are kept stored in the memory as navigation tune-in points, whereas the other nine chunks 12 are discarded.

In another embodiment, the cached or stored chunks 14 do not necessarily have to be equally distributed in time. For instance, they are sparser the further away they are from the current play out position 2. For instance, very close to the current play out position 2 all chunks 14E are kept stored, see FIG. 4. A bit further away, some of the stored chunks 12A are selected to be discarded while keeping remaining chunks 14A, 14B stored as navigation tune-in points. Still further away, more of the stored chunks 12B, 12C, 12D are discarded so that the chunks 14C, 14D selected to be kept stored become sparser and sparser further away from the current play out position 2. Such an embodiment results in a non-periodic distribution of the navigation tune-in points throughout the previous, already played out part 3 of the streamed video bitstream 1.

In an embodiment, step S3 of FIG. 2 thereby comprises discarding, for a pair of neighboring, according to the output time, chunks 14A, 14B; 14C, 14D kept stored as navigation tune-in points, a number of the stored chunks 12A; 12B, 12C, 12D having a respective output time in between the output times of the pair of neighboring chunks 14A, 14B; 14C, 14D. The number is in this embodiment dependent on the output times of the pair of chunks 14A, 14B; 14C, 14D relative to the current output time 2.

Thus, for a first pair of neighboring chunks 14A, 14B kept stored as navigation tune-in points a first number of intermediate stored chunks 12A are discarded in step S3. Correspondingly, for a second pair of neighboring chunks 14C, 14D kept stored as navigation tune-in points a second number of intermediate stored chunks 12B, 12C, 12D are discarded in step S3. In such a case, the first number of intermediate stored chunks 12A could be different from the second number of intermediate stored chunks 12B, 12C, 12D depending on the output times of the first pair of neighboring chunks 14A, 14B and the second pair of neighboring chunks 14C, 14D relative to the current play out time 2.

In a particular embodiment, the number is larger for a pair of neighboring chunks 14C, 14D having more distant output times relative to the current output time 2 as compared to a pair of neighboring chunks 14A, 14B having more recent output times relative to the current output time 2.

Thus, the second number of intermediate stored chunks 12B, 12C, 12D is preferably larger than the first number of intermediate stored chunks 12A if the second pair of neighboring chunks 14C, 14D has more distant output times than the first pair of neighboring chunks 14A, 14B.

This means that the further away one moves within the previous, already played out part 3 of the streamed video bitstream 1 the larger percentage of the stored chunks 12, 14 are preferably discarded in step S3.

For instance, very close to the present play out position 2 all stored chunks 14E are kept stored as navigation tune-in points. A bit further away, perhaps two out of three chunks 12A are discarded. Still further away, perhaps only every sixth chunk 14C, 14D is kept stored as navigation tune-in point and yet further away every twelfth chunk is kept stored. This can be implemented by having certain time limits. When a chunk is older than a certain threshold time, it is only kept if the output time (or play out time or starting time), of the chunk is evenly divisible by, for instance, three. When the chunks "gets older" than a second threshold time the chunk is only kept stored if its output time is evenly divisible by six. Finally, when a chunk gets older than a third threshold time, the chunk is only kept stored if its output out time is evenly divisible by twelve.

Hence, in an embodiment, step S3 of FIG. 2 comprises discarding every stored chunk 12 for the previous, already played out part of the streamed video bitstream 1 having an output time older than a first threshold time relative to a current output time 2 and having an output time that is not evenly divisible by a divisor while keeping, stored as navigation tune-in points, every stored chunk 14 for the previous, already played out part 3 of the streamed video bitstream 1 having an output time older than the first threshold time relative to the current output time 2 and having an output time that is evenly divisible by the divisor.

In the above described embodiment, a single threshold time is used to determine whether a stored chunk 12, 14 should be discarded or kept stored as navigation tune-in point. This concept can of course be extended to using two or more threshold times.

Hence, in an embodiment, step S3 comprises discarding every stored chunk 12A for the previous, already played out part 3 of the streamed video bitstream 1 having an output time older than the first threshold time but not older than a second threshold time relative to the current output time 2 and having an output time that is not evenly divisible by the divisor. This means that the step also comprises keeping, stored as navigation tune-in points, every stored chunk 14A, 14B for the previous, already played out part 3 of the streamed video bitstream 1 having an output time older than the first threshold time but not older than the second threshold time relative to the current output time 2 and having an output time that is evenly divisible by the divisor. Step S3 also comprises discarding every stored chunk 12B, 12C, 12D for the previous, already played out part 3 of the streamed video bitstream 1 having an output time older than the second threshold time relative to the current output time 2 and having an output time that is not evenly divisible by two times the divisor. This means that the step also comprises keeping, stored as navigation tune-in points, every stored chunk 14C, 14D for the previous, already played out part 3 of the streamed video bitstream having an output time older than the second threshold time relative to the current output time 2 and having an output time that is evenly divisible by two times the divisor.

This concept can be extended further using more than two different threshold times.

The amount of chunks to keep stored as navigation tune-in points could alternatively be defined as a decaying percentage. Since stored chunks can be discarded but not recovered after deletion, a possibility is to halve the granularity for each step going backwards in time. FIG. 4 shows an example of how the chunks could be kept stored. Thus, for the most recent portion of the already played out part 3 all chunks 14E are kept stored (100% cached), in the preceding portion half of the chunks 14A, 14B are kept stored (50% cached), then a quarter of the chunks are kept stored (25% cached), and then an eighth of the chunks are kept stored (12.5% cached). This can continue even further or remaining stored chunks in the most distant (first) portion of the already played out part 3 of the streamed video bitstream 1 are all discarded (0% cached). The respective portions could all be of a same size in terms of play out duration or they could be of different play out durations.

Another possibility is to start removing every, for instance, fifth chunk (80% cached), then removing every fourth of the remaining stored chunks (60% cached), then every third of the remaining stored chunks (40% cached), then every second of the remaining stored chunks (20% cached), then every second of the remaining stored chunks (10% cached) and so on.

Hence, in an embodiment, step S3 of FIG. 2 comprises discarding every $N_M{}^{th}$ stored chunk 12 for the previous, already played out part 3 of the streamed video bitstream 1 having an output time older than M times a threshold time relative to a current output time 2 while keeping, stored as navigation tune-in points, remaining stored chunks 12 for the previous, already played out part 3 of the streamed video bitstream 1. In an embodiment, M=1 ... Max, wherein Max is a defined integer value and $N_k > N_{k+1}$ for each k=1 ... Max−1.

This means that the further away one moves from the current output time 2 within the already played out part 3 of the streamed video bitstream the larger percentage of the stored chunks 12 are discarded and the sparser the chunks 14 kept stored as navigation tune-in points.

The chunks 12 kept stored in step S3 can be used as navigation tune-in points if the user would like to jump to a tune-in position present within the already played out part 3 of the streamed video bitstream 1. This means that the decoding and play out can be started immediately at the stored chunk 14, thereby relaxing the need for first requesting and receiving encoded video data of the video server or provider and building up a buffer of encoded video data before the play out can be started. Hence, the selective removal of stored chunks and selective keeping of stored chunks as navigation tune-in point significantly reduces any delay experienced when jumping or navigating to a new play out position within an already played out part 3 of the streamed video bitstream 1.

FIG. 5 is a flow chart illustrating additional steps of the method shown in FIG. 2 during a navigation or tune-in process. The method continues from step S3 in FIG. 2. A next step S10 comprises decoding encoded video data of a chunk stored as navigation tune-in point to form decoded video data based on reception of a tune-in request specifying a tune-in position within the streamed video bitstream associated with the chunk. Step S11 comprises receiving, while decoding the encoded video data of the chunk and/or playing out the decoded video data of the chunk, encoded video data of a following chunk having a start aligned with an end of the chunk.

Thus, in an embodiment, decoding of the encoded video data of a stored chunk and play out of the resulting decoded video data is performed based on a tune-in request that specifies a tune-in position within the previous, already played out part of the streamed video bitstream that is associated with the chunk. The tune-in request may, for instance, be generated by the user moving, using a user device, a video cursor to a position within the streamed video bitstream during a video navigation procedure. The position that the user then moves the video cursor to corresponds to the tune-in position within the streamed video bitstream.

A chunk is associated with a tune-in position if the encoded video data carried by the chunk corresponds to a position within the streamed video bitstream at or at least substantially close to the tune-in position.

FIG. 8 illustrates this concept by showing the chunks 14 kept stored in the previous, already played out part 3 of the streamed video bitstream. The tune-in position is indicated by reference number 5 in the figure. The stored chunk 14 selected to be decoded in step S10 could be the stored chunk that is closest in time to the tune-in position 5. An alternative is to select the closest preceding stored chunk 14 relative to the tune-in position 5 so that the user will never miss any video content. As an example, if every chunk is of 1 s and every tenth chunk 14 is kept stored as navigation tune-in position and the user chooses a tune-in position 5 at t=17, then the stored chunk having output time t=10 could be selected instead of the stored chunk having output time t=20 even though t=20 is closer to the tune-in position 5. The reason being that if the stored chunk having output time t=20 was selected then the user would have missed three seconds of video content.

FIG. 6 is a flow chart illustrating additional steps of the method shown in FIGS. 2 and 3. The method continues from step S3 in FIG. 2. A next step S20 comprises receiving a tune-in request specifying a tune-in position 5 within the streamed video bitstream 1. A next step S21 comprises selecting a navigation tune-in point among the chunks 14 kept stored as navigation tune-in point. The method then continues to step S10 of FIG. 5, where the encoded video data of the chunk selected in step S21 is decoded.

While the encoded video data of the chunk 14 associated with the tune-in position 5 is decoded and/or decoded video data of this chunk 14 is played out, encoded video data of a following chunk 16 having a start aligned with the end of the chunk 14 is received. This means that the reception or download of the encoded video data of the following chunk 16 can be performed in the background while the stored chunk 14 is currently decoded and played out. Once the end of the stored chunk 14 has been reached the encoded video data of the following chunk 16 or at least a first part thereof is available. Accordingly, decoding and play out of video from the following chunk 16 can be smoothly continued by switching from the stored chunk 14 to the following chunk 14.

This means that the decoded video data of the stored chunk 14 is played out until reaching its end. Thereafter, the play out continues by switching, at the end of the stored chunk 14, from playing out the decoded video data of the stored chunk 14 to playing out decoded video data obtained by decoding encoded video data of the following chunk 16.

Hence, once the end of the stored chunk 14 has been reached the decoding and play out can continue with the following chunk 16, the encoded video data of which has been received while decoding and/or playing out the stored chunk 14 as previously described herein in connection with step S11 in FIG. 5.

In general, a switching point should start with an independently decodable picture. However, each chunk 14, 16, 18 of the streamed video bitstream preferably starts with such an independently decodable picture so switching can smoothly be performed between the stored chunk 14 and the received following chunk 16.

The reception of the encoded video data for further following chunks 18 continues while decoding and/or playing out the stored chunk 14 and/or decoding and/or playing out the following chunk 16.

The stored chunk 14 that is already available as navigation tune-in position when receiving the tune-in request implies that the video player or decoder will get time corresponding to the decoding time for the encoded video data of the stored chunk 14 and the play out duration of the stored chunk 14 to request the following chunk 16 (and further chunks 18) from the video server or provider and start decoding the decoded video data of the following chunk 16 to have the decoded video data ready for output once the play out end of the stored chunk 14 is reached.

The encoded video data of the following chunk 16 could be at a same quality or bit rate as the encoded video data of the stored chunk 14. However, it could be preferred to request a following chunk 16 with encoded video data having a quality or bit rate that is lower than the stored chunk 14. The reason being that the time from requesting the following chunk 16 until it is received and the encoded video data of the following chunk 16 is decoded will typically be shorter if the encoded video data of the following chunk 16 has a low quality or bit rate as compared to having a higher quality or bit rate.

This means that if a lower quality or bit rate is used for the following chunk 16 then the risk of not having the encoded video data at the start of the following chunk 16 received and decoded when reaching the play out end of the stored chunk 14 is significantly reduced as compared to using a higher quality or bit rate.

Thus, in an embodiment step S11 comprises receiving, while decoding the encoded video data of the chunk 14 and/or playing out the decoded video data of the chunk 14, encoded video data of the following chunk 16 at a quality or bit rate that is lower than the quality of bit rate of the chunk 14.

The actual quality or bit rate to use for the following chunk 16 could be determined by the video player or user device comprising the video player based on various criteria. For instance, the quality of the communication link between the video player or user device and the video server or provider could be relevant for the quality or bit rate of the following chunk 16. Thus, if the communication link currently experiences low quality then it may be more appropriate to request the following chunk 16 with a lower quality or bit rate as compared to a situation when the communication link is of a higher quality and can thereby support higher transmission rates. Furthermore, the buffer status of the video player or the decoder in the video player could be used to determine a suitable quality or bit rate for the following chunk 16. Generally, the lower buffer status, i.e. less video data stored in the buffer, the lower quality or bit rate should be used for the following chunk 16 to reduce the risk of depleting the buffer before the play out can continue from the stored chunk 14 to the following chunk 16. A further criterion could be the current play out rate (run rate). In such a case, the bit rate of the following chunk 16 could be set to a predefined portion of the play out rate, such as one quarter or one half of the play out rate. These different criterion may be combined when selecting a suitable quality or bit rate for the following chunk 16.

In an embodiment, the video player or user device could be configured to request low quality or bit rate chunks 16, 18 until the buffer size is built up to a threshold value. This means that a reduced quality or bit rate of requested chunks 16, 18 continues until the video player or user device has sufficient large buffer size to cope with any bandwidth fluctuations even when receiving chunks at the high quality or bit rate.

In another embodiment, the video player or user device requests low quality or bit rate chunks until the buffer size is built up to a first threshold value. At that point the video player or user device instead requests further chunks of a higher quality or bit rate, potentially a step-by-step higher quality or bit rate for each following chunk.

The reduction in quality or bit rate may be achieved by using a lower resolution, a lower picture or frame rate and/or a smaller picture or frame size for the following chunk 16 as compared to the stored chunk 14. The reduction in quality or bit rate of the following chunk 16 may, in an example applicable to scalable video, mean that the following chunk 16 carries encoded video data of merely a base layer or at least a fewer number of layers as compared to the stored chunks. Accordingly, less amount of video data need to be received and decoded for the following chunk 16 as compared to requiring all layers or at least the same number of layers as for the stored chunk 14.

A potential problem with having following chunks 16, 18 of a lower quality or bit rate than the stored chunk 14 is that the quality or bit rate may be uneven. For instance, assume that the current communication link can support download of 500 kbits encoded video data in one second. When receiving the tune-in request the play out starts with the stored chunk 14, see FIG. 9. Assume that this stored chunk 14 was of a quality that demanded 400 kbps. Further assume that the following chunk 16 requested from the video server or provider demands 100 kbps, i.e. a lower quality in order to avoid glitches due to bandwidth fluctuations. After receiving this following chunk 16, which should take 0.2 s, a higher quality might be requested for the next following chunk 18, such as 200 kbps. The quality may then be further increased or ramped up until reaching the steady state quality of 400 kbps as shown in FIG. 9.

A potential problem with such an approach is that the quality will be uneven. First the user will get very good quality, corresponding to the stored chunk 14 at 400 kbps, followed by quite bad quality, corresponding to the following chunk 16 at 100 kbps until after a while the quality is back to the good quality of 400 kbps. Such a back-and-forth between different quality levels is quite unpleasant to watch.

An embodiment solves this solution of back-and-forth quality changes, see FIGS. 7 and 10. The method continues from step S10 in FIG. 5. A next step S30 comprises reducing the quality or bitrate of the stored chunk 14 prior to playing out the decoded video data of the chunk 14.

In an embodiment, step S30 comprises reducing the quality or bit rate of the chunk 14 to a quality or bit rate level substantially equal to or lower than the quality or bit rate of the following chunk 16.

In this case there will be now switching back-and-forth in quality during play out. In clear contrast, the quality or bit rate level preferably increases or ramps up as shown in FIG. 10 or increases in one or more steps until reaching the steady state quality or bit rate level.

The reduction in quality or bit rate can be done in many ways. In an embodiment, step S30 comprises downsampling the resolution of the encoded video data of the chunk 14 to achieve the reduction in quality or bit rate. Another solution is to reencode the chunk 14 with a lower quantization parameter (QP) value. This solution takes longer time and requires more processing power, whereas downsampling can be done very efficiently using Graphics Processing Unit (GPU) hardware at low processing power. Further approaches of reducing the quality or bit rate is to filter the decoded video data, such as using a Gaussian filter, or reducing the number of bits per picture.

In an embodiment, the video player or user device has access to a table or information matching different quality or bit rate levels with suitable picture resolution. In such a case, the level of downsampling can be selected based on the target quality or bit rate for the stored chunk 14. This target quality or bit rate could be equal to the quality or bit rate of the following chunk 16 (see FIG. 10) or be set as a defined percentage of the quality or bit rate of the following chunk 16.

The reduction in quality or bit rate of the chunk also implies that lesser amount of data need to be stored since a quality-reduced chunk typically occupies less memory space as compared to the chunk prior to any reduction in quality or bit rate.

FIG. 11 is a flow chart illustrating an additional, optional step of the method shown in FIG. 5. The method continues from step S11. A next step S40 comprises receiving, while decoding the encoded video data of the chunk 14, playing out the decoded video data of the chunk 14, decoding the encoded video data of the following chunk 16 and/or playing out the decoded video data of the following chunk 16, a second following chunk 18 having a start aligned with an end of the following chunk 16. The quality or bit rate of this second following chunk 18 is higher than the quality or bit rate of the following chunk 16 but lower than the quality or bit rate of the chunk 14 (prior to any reduction in the quality or bit rate of the chunk 14).

Hence, this embodiment corresponds to step-by-step increasing the quality or bit rate of the following chunks 16, 18 until finally reaching the original quality or bit rate of the stored chunk 14 as shown in FIG. 10.

In a particular embodiment, some of the chunks in the streamed video bitstream may be marked as prioritized chunks. These chunks could, for instance, contain encoded video data representing various parts of a movie that are regarded as being probable tune-in positions depending on their actual content. In such a case, discarding selected chunks preferably does not involve discarding any of the prioritized chunks. In clear contrast, they are preferably selected to be kept stored as navigation tune-in positions.

In the above described embodiments, selected chunks are discarded while keeping selected chunks as navigation tune-in points. In an alternative approach, instead of keeping complete chunks stored as navigation tune-in points sub-chunks, i.e. portions of chunks, could be kept stored as navigation tune-in points. Such an approach is illustrated in the flow chart of FIG. 12 with further references to FIGS. 13-15.

The method starts in step S50, which comprises storing chunks 20, 22 of encoded video data of a streamed video bitstream 1 partitioned into multiple chunks 20, 22. Each chunk 20, 22 of the multiple chunks 20, 22 starts with an independently decodable picture. A next step S51 comprises decoding encoded video data of the streamed video bitstream to form decoded video data to be output for display. The following step S52 comprises discarding selected sub-chunks 25, 27 of encoded video data of the stored chunks 20, 22 for a previous, already played out part 3 of the streamed video bitstream 1 while keeping, stored as navigation tune-in points, selected sub-chunks 21, 23 of encoded video data for the previous, already played out part 3 of the streamed video bitstream 1. Each sub-chunk 21, 23, 25, 27 corresponds to a sub-portion of a chunk 20, 22 and starts with an independently decodable picture. A play out duration of each sub-chunk 21, 23, 25, 27 is shorter than a play out duration of the chunks 20, 22.

The two steps S50 and S51 correspond to steps S1 and S2 in FIG. 2. However, instead of discarding selected chunks while keeping selected chunks stored as navigation tune-in points in step S3 of FIG. 2, step S52 of FIG. 12 comprises discarding selected sub-chunks while keeping selected sub-chunks stored as navigation tune-in points.

The play out durations of the sub-chunks 21, 23, 25, 27 are shorter than the play out durations of the chunks 20, 22. For instance, if a chunk 20, 22 has a play out duration of 10 s, such as a HLS media segment, then a sub-chunk 21, 23, 25, 27 could, for instance, have a play out duration of about 1 s or 2 s. This means that the amount of encoded video data that is kept stored following the selective discard or removal in step S52 could be reduced by keeping stored sub-portions of chunks 20, 22 instead of the complete chunks 20, 22.

In an embodiment, step S52 comprises discarding the selected sub-chunks 25, 27 while keeping, stored as navigation tune-in points, sub-chunks 21, 23 corresponding to a first sub-portion or a last sub-portion of the chunks 20, 22.

Figure 14:
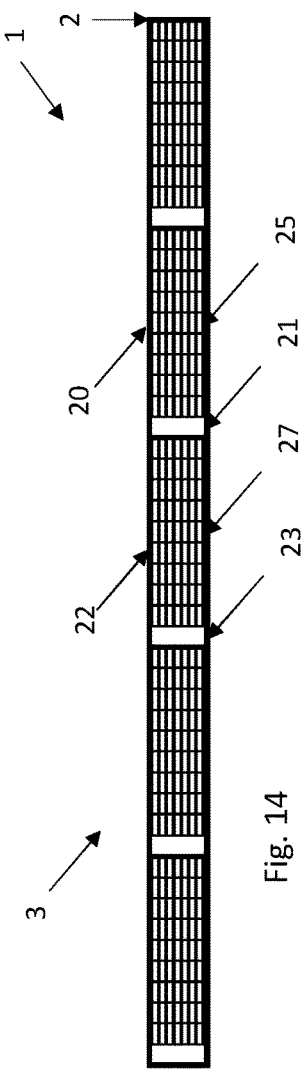
FIG. 14 illustrates a played out part of a streamed video bitstream processed according to a further embodiment.

This is shown in FIGS. 13 and 14. In FIG. 13, all sub-chunks 25, 27 of each chunk 20, 22 are discarded in step S52 except the last sub-chunk 21, 23, which is kept stored as navigation tune-in point. Correspondingly, in FIG. 14 all sub-chunks 25, 27 of each chunk 20, 22 are discarded in step S52 except the first sub-chunk 21, 23.

Although it is generally preferred to keep sub-chunk 21, 23 corresponding the first sub-portion or the last sub-portion of a chunk 20, 22 stored as navigation tune-in point the embodiments are not limited thereto. In fact, a sub-chunk kept stored as navigation tune-in point could correspond to an intermediate sub-portion of a chunk or indeed extend over a border between two adjacent chunks.

Figure 15:
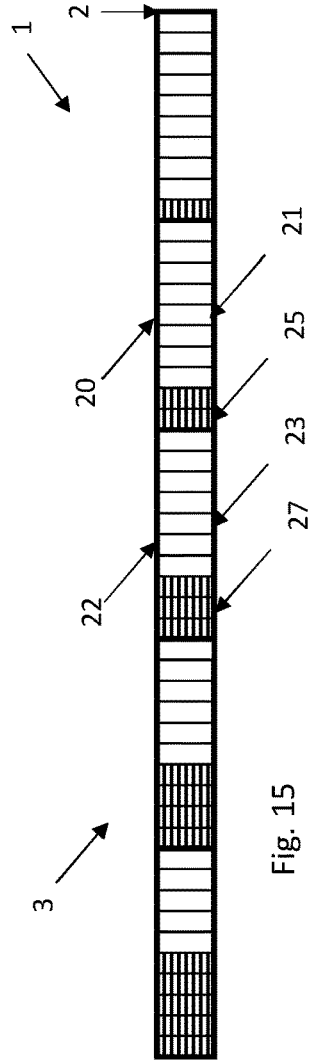
FIG. 15 illustrates a played out part of a streamed video bitstream processed according to yet another embodiment.
Figure 12:
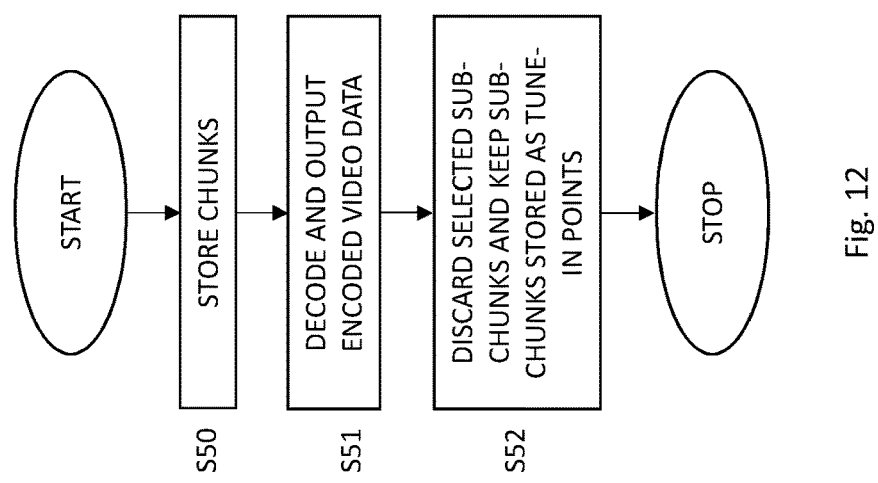
FIG. 12 is a flow chart illustrating a video processing method according to another embodiment.

FIG. 15 illustrates another variant resulting from an embodiment of step S52 in FIG. 12. In this embodiment step S52 comprises discarding $M_1$ sub-chunks 25 out of N sub-chunks 21, 25 for a first chunk 20 in the previous, already played out part 3 of the streamed video bitstream 1 while keeping $N-M_1$ sub-chunks 21 of the first chunk 20 stored as navigation tune-in points. Step S52 also comprises discarding $M_2$ sub-chunks 27 out of N sub-chunks 23, 27 for a second chunk 22 in the previous, already played out part 3 of the streamed video bitstream 1 while keeping $N-M_2$ sub-chunks 23 of the second chunk 22 stored as navigation tune-in points. In an embodiment, $M_2>M_1$ and the second chunk 22 has an older play out time as compared to the first chunk 20 relative to a current play out time 2.

In this embodiment, a larger portion of the encoded video data of a chunk 20, 22 is discarded in step S52 the further away the chunk 20, 22 is from the current play out time 2. FIG. 15 exemplifies this concept by discarding one while keeping nine sub-chunks in the most recent chunk, discarding two sub-chunks 25 while keeping eight sub-chunks 21 in the second most recent chunk 20, discarding three sub-chunks 27 while keeping seven sub-chunks 23 in the third most recent chunk 22, and so on.

In an embodiment, no sub-chunks are discarded for the most recent chunk and the removal of sub-chunks 25, 27 first starts with older chunks 20, 22 within the already played out part 3 of the streamed video bitstream 1.

Furthermore, the step-by-step increase in the number of sub-chunks 25, 27 that are discarded in step S52 for ever older chunks 20, 22 does not necessarily imply that the number of discarded sub-chunks 25, 27 has to increase for each older chunk 20, 22. For instance, the same number of discarded sub-chunks could be used for a set of neighboring chunks and then this number is increased when moving to an older set of neighboring chunks, and so on.

FIG. 16 is a flow chart illustrating additional, optional steps of the method shown in FIG. 12 involving usage of a stored sub-chunk as navigation tune-in point. The method continues from step S52 in FIG. 12. A next step S60 comprises decoding encoded video data of a sub-chunk stored as navigation tune-in point to form decoded video data based on reception of a tune-in request specifying a tune-in position within the streamed video bitstream associated with the sub-chunk. Step S61 comprises receiving, while decoding the encoded video data of the sub-chunk and/or playing out the decoded video data of the sub-chunk, encoded video data of a chunk of which the sub-chunk is a sub-portion, or of a chunk or of a following sub-chunk having a start aligned with an end of the sub-chunk.

With reference to FIG. 17, in an embodiment, decoding of the encoded video data of a sub-chunk 21 and play out of the resulting decoded video data is performed based on a tune-in request that specifies a tune-in position 5 within the already played out part 3 of the streamed video bitstream that is associated with the sub-chunk 21. The tune-in request may, for instance, be generated by the user moving, using a user device, a video cursor to a position within the streamed video bitstream during a video navigation procedure. The position that the user then moves the video cursor to corresponds to the tune-in position 5 within the streamed video bitstream.

A sub-chunk 21 is associated with a tune-in position 5 if the video data carried by the sub-chunk 21 corresponds to a position within the streamed video bitstream at or at least substantially close to the tune-in position 5.

As shown in FIG. 17 multiple sub-chunks 21 may be stored as navigation tune-in positions. In an embodiment, the sub-chunk 21 associated with the tune-in position 5 could then be the sub-chunk 21 among the multiple sub-chunks 21 that is closest to the tune-in position 5. In another embodiment, the sub-chunk 21 associated with the tune-in position 5 is the first sub-chunk 21 that precedes the tune-in position 5. This is schematically illustrated in the flow chart of FIG. 6. The method continues from step S52 in FIG. 12. A next step S52 receives the tune-in request specifying the tune-in position 5. A following step S21 comprises selecting a stored sub-chunk 21 as navigation tune-in point based on the tune-in position 5.

While the video player or user device decodes encoded video data of the sub-chunk 21 associated with the tune-in position 5 and/or plays out decoded video data of this sub-chunk 21, encoded video data of a chunk 24 is received. This means that the reception or download of the encoded video data of the chunk 24 can be performed in the background while the video player or user device is currently decoding and playing out the sub-chunk 21. Once the end of the sub-chunk 21 has been reached the video player or user device has access to the encoded video data of the chunk 24 or at least a first part thereof and can thereby directly continue decoding and playing out video from the chunk 24 by switching from the sub-chunk 21 to the chunk 24.

In an embodiment, the method also comprises decoding encoded video data of chunks in the streamed video bitstream to form decoded video data. The decoded video data of the chunks in the streamed video bitstream are played out. The tune-in request is then received. Thus, in this embodiment the tune-in request is received during play out of the streamed video bitstream, such as in the form of video navigation within the streamed video bitstream. This further means that the user thereby wants to jump from the current decoding and/or play out position within the video bitstream to the tune-in position 5 specified by the user-initiated tune-in request.

The switching from decoding and playing out encoded video data of the stored sub-chunk selected as navigation tune-in position to decoding and playing out encoded video data of the chunk or sub-chunk received in step S61 of FIG. 16 can be performed according various embodiments.

Generally, the method comprises playing out the decoded video data of the sub-chunk 21. The method then comprises switching, preferably at the end of the sub-chunk 21, from playing out the decoded video data of the sub-chunk 21 to playing out decoded video data obtained by decoding encoded video data of the chunk 24 or sub-chunk 29 received in step S61.

Hence, once the end of the sub-chunk 21 has been reached the decoding and play out can continue with the chunk 24 or sub-chunk 29, the encoded video data of which has been received while decoding and/or playing out the sub-chunk 21 as previously described herein in connection with step S61 in FIG. 12.

If the end of the sub-chunk 21 is aligned with regard to play out time with the start of the chunk 24 as shown in FIG. 17 the switch preferably takes place from the end of the sub-chunk 21 to the start of the chunk 24. This is possible since the chunk 24 starts with an independently decodable picture.

However, if the start of the sub-chunk 21 is aligned with the start of a chunk 20 as shown in FIG. 18 the switch preferably takes place from the end of the sub-chunk 21 to a switching position 6 within the chunk 24 received in step S61 that is aligned with regard to the play out time to the end of the sub-chunk 21. In this case, the switching position 6 within the chunk 24 that is aligned with the end of the sub-chunk 21 preferably comprises an independently decodable picture to simplify a smooth switch from decoding and playing out the sub-chunk 21 to decoding and playing out the chunk 24 from the switching position 6 corresponding to the end of the sub-chunk 21.

In general, a switching point should start with an independently decodable picture, although this is not mandatory. This means that the sub-chunk 21 preferably starts with an independently decodable picture but the switching position 6 within the chunk 24 does not necessarily have to start with an independently decodable picture. For instance, decoding could be started at an independently decodable picture in the chunk 24 preceding the switching position 6 and continuing until reaching the switching point 29 but not outputting these decoded pictures in the chunk 24. In such a solution, decoding takes place both for the sub-chunk 21 and a portion of the chunk 24 preceding the switching position 6 but only decoded pictures from the sub-chunk 21 are output for display. In such a case, switching from the sub-chunk 21 to the chunk 24 is possible even if there is no independently decodable picture in the chunk 24 at the switching position 6.

FIG. 19 illustrates another variant where the start or end of the selected stored sub-chunk 21 does not necessarily have to be aligned with regard to play out time to the start of a chunk 20. In this embodiment, either a complete chunk 24 could be requested and received in step S61. This chunk 24 then has a start aligned with the start of the chunk 20 to which the sub-chunk 21 is a sub-portion. Switching could take place at the switching position 6 without any decoding of the previous part of the chunk 24 if there is an independently decodable picture at this switching position 6. In other case, the previous part of the chunk 24 is decoded as mentioned above but no pictures thereof are output for display until reaching the switching position 6.

In another approach, not the complete chunk 24 is requested and received in step S61. In clear contrast, the sub-portion or sub-chunks 29 of the chunk 24 starting at the switching position 6 and continuing to the end of the chunk 24 are received in step S61 as shown in FIG. 19. In such a case, the first sub-chunk 29 received in step S61 preferably starts with an independently decodable picture.

In either case, the decoding and play out then continues with following chunks 26 that are received during the video session following the video navigation.

In an embodiment, step S61 of FIG. 16 comprises receiving, while decoding the encoded video data of the sub-chunk 21 and/or playing out the decoded video data of the sub-chunk 21, encoded video data of the chunk 24 having the start aligned with the start of the chunk 20, of which the sub-chunk 21 is a sub-portion, or of the chunk 24 having the start aligned with the end of the sub-chunk 21 or of the following sub-chunk 29 at a quality or bit rate that is lower than a quality or bit rate of the sub-chunk 21.

Using a lower quality or bit rate for the received chunk 24 or sub-chunk 29 generally means that the encoded video data of the chunk 24 or sub-chunk 29 can be received within a shorter period of time given a certain communication bandwidth. Hence, the risk of not having received encoded video data of the chunk 24 or sub-chunk 29 when the decoding and play out has reached the end of the stored sub-chunk 21 is reduced by requesting a chunk 24 or sub-chunk 29 of lower quality or bit rate.

In an embodiment, a reduction of the quality or bit rate of the sub-chunk can be performed in order to solve any problem with jumping back-and-forth in quality as previously described herein. In such a case, the method continues from step S60 in FIG. 16 to step S30 in FIG. 7. This step S30 comprises reducing the quality or bit rate of the sub-chunk 21 prior to playing out the decoded video data of the sub-chunk 21.

In a particular embodiment, step S30 comprises reducing the quality or bit rate of the sub-chunk 21 to a quality or bit rate level substantially equal to or lower than the quality or bitrate of the chunk 24 having the start aligned with the start of the chunk 20, of which the sub-chunk corresponds to a sub-portion, or of the chunk 24 having the start aligned with the end of the sub-chunk 21 or of the following sub-chunk 29.

The reduction in quality or bit rate of the sub-chunk 21 can be performed according to any of the embodiments previously described herein. For instance, step S30 could involve downsampling the resolution of the encoded video data of the sub-chunk 21.

Another aspect of the embodiments relates to a video processing device. The video processing device is configured to store chunks of encoded video data of a streamed video bitstream partitioned into multiple chunks. Each chunk of the multiple chunks starts with an independently decodable picture. The video processing device is also configured to decode encoded video data of the streamed video bitstream to form decoded video data to be output for display. The video processing device is further configured to discard a selected portion of the stored chunks for a previous, already played out part of the streamed video bitstream while keeping selected stored chunks for the previous, already played out part of the streamed video bitstream stored as output time non-adjacent navigation tune-in points distributed throughout the previous, already played out part of the streamed video bitstream. In an embodiment, the video processing device is configured to discard at least one stored chunk for the previous, already played out part of the streamed video bitstream while keeping, as navigation tune-in point, at least one selected stored chunk preceding, according to the output time, the at least one stored chunk to be discarded and keeping, as navigation tune-in point, at least one selected chunk following, according to the output time, the at least one stored chunk to be discarded.

In an embodiment, the video processing device is configured to discard the selected portion of the stored chunks for the previous, already played out part of the streamed video bitstream while keeping, stored as navigation tune-in points, every $N^{th}$ stored chunk for the previous, already played out part of the streamed video bitstream. The parameter N is an integer equal to or larger than 2.

In an embodiment, the video processing device is configured to discard, for a pair of neighboring, according to the output time, chunks kept stored as navigation tune-in points, a number of the stored chunks having a respective output time in between the output times of the pair of neighboring chunks. The number is dependent on the output times of the pair of chunks relative to a current output time.

In an embodiment, the video processing device is configured to discard every stored chunk for the previous, already played out part of the streamed video bitstream having an output time older than a first threshold time relative to a current output time and having an output time that is not evenly divisible by a divisor while keeping, stored as navigation tune-in points, every stored chunk for the previous, already played out part of the streamed video bitstream having an output time older than the first threshold relative to the current output time and having an output time that is evenly divisible by the divisor.

In an embodiment, the video processing device is configured to discard every stored chunk for the previous, already played out part of the streamed video bitstream having an output time older than the first threshold time but not older than a second threshold time relative to the current output time and having an output time that is not evenly divisible by the divisor while keeping, stored as navigation tune-in points, every stored chunk for the previous, already played out part of the streamed video bitstream having an output time older than the first threshold but not older than the second threshold time relative to the current output time and having an output time that is evenly divisible by the divisor. The video processing device is also configured to discard every stored chunk for the previous, already played out part of the streamed video bitstream having an output time older than the second threshold time relative to the current output time and having an output time that is not evenly divisible by two times the divisor while keeping, stored as navigation tune-in points, every stored chunk for the previous, already played out part of the streamed video bitstream having an output time older than the second threshold time relative to the current output time and having an output time that is evenly divisible by two times the divisor.

In an embodiment, the video processing device is configured to discard every $M^{th}$ stored chunk for the previous, already played out part of the streamed video bitstream having an output time older than a multiple of a threshold time relative to a current output time while keeping, stored as navigation tune-in points, remaining stored chunks for the previous, already played out part of the streamed video bitstream.

In an embodiment, the video processing device is configured to decode encoded video data of a chunk stored as navigation tune-in point to form decoded video data based on reception of a tune-in request specifying a tune-in position within the streamed video bitstream associated with the chunk. The video processing device is also configured to receive, while decoding the encoded video data of the chunk and/or playing out the decoded video data of the chunk, encoded video data of a following chunk having a start aligned with an end of the chunk.

In an embodiment, the video processing device is configured to receive, while decoding the encoded video data of the chunk and/or playing out the decoded video data of the chunk, encoded video data of the following chunk at a quality or bit rate that is lower than the quality or bit rate of the chunk.

In an embodiment, the video processing device is configured to reduce the quality or bit rate of the chunk prior to playing out the decoded video data of the chunk.

In an embodiment, the video processing device is configured to reduce the quality or bit rate of the chunk to a quality or bit rate level substantially equal to or lower than the quality of the following chunk.

In an embodiment, the video processing device is configured to downsample the resolution of the encoded video data of the chunk.

In an embodiment, the video processing device is configured to receive, while decoding the encoded video data of the chunk, playing out the decoded video data of the chunk, decoding the encoded video data of the following chunk and/or playing out the decoded video data of the following chunk, a second following chunk having a start aligned with an end of the following chunk. The quality or bit rate of the second following chunk being higher than the quality or bitrate of the following chunk but lower than the quality or bit rate of the chunk.

A further aspect of the embodiments relates to a video processing device. The video processing device is configured to store chunks of encoded video data of a streamed video bitstream partitioned into multiple chunks. Each chunk of the multiple chunks starts with an independently decodable picture. The video processing device is also configured to decode encoded video data of the streamed video bitstream to form decoded video data to be output for display. The video processing device is further configured to discard selected sub-chunks of encoded video data of the stored chunks for a previous, already played out part of the streamed video bitstream while keeping, stored as navigation tune-in points, selected sub-chunks of encoded video for the previous, already played out part of the streamed video bitstream. Each sub-chunk corresponds to a sub-portion of a respective chunk and starts with an independently decodable picture and a play out duration of each sub-chunk is shorter than a play out duration of the respective chunks.

In an embodiment, the video processing device is configured to keep, stored as navigation tune-in points, sub-chunks corresponding to a first sub-portion or a last sub-portion of the respective chunk.

In an embodiment, the video processing device is configured to discard $M_1$ sub-chunks out of N sub-chunks for a first chunk in the previous, already played out part of the streamed video bitstream while keeping $N-M_1$ sub-chunks of the first chunk stored as navigation tune-in points. The video processing device is also configured to discard $M_2$ sub-chunks out of N sub-chunks for a second chunk in the previous, already played out part of the streamed video bitstream while keeping $N-M_2$ sub-chunks of the second chunk stored as navigation tune-in points. In an embodiment, $M_2 > M_1$ and the second chunk has an older play out time as compared to the first chunk relative to a current play out time.

In an embodiment, the video processing device is configured to decode encoded video data of a sub-chunk stored as navigation tune-in point to form decoded video data based on reception of a tune-in request specifying a tune-in position within the streamed video bitstream associated with the sub-chunk. The video processing device is also configured to receive, while decoding the encoded video data of the sub-chunk and/or playing out the decoded video data of the sub-chunk, encoded video data of a chunk having a start aligned with a start of a chunk, of which the sub-chunk corresponds to a sub-portion, or of a chunk or of a following sub-chunk having a start aligned with an end of the sub-chunk.

In an embodiment, the video processing device is configured to receive, while decoding the encoded video data of the sub-chunk and/or playing out the decoded video data of the sub-chunk, encoded video data of the chunk having the start aligned with the start of the chunk, of which the sub-chunk corresponds to a sub-portion, or of the chunk having the start aligned with the end of the sub-chunk or of the following sub-chunk at a quality or bit rate that is lower than a quality or bit rate of the sub-chunk.

In an embodiment, the video processing device is configured to reduce the quality or bit rate of the sub-chunk prior to playing out the decoded video data of the sub-chunk.

In an embodiment the video processing device is configured to reduce the quality or bit rate of the sub-chunk to quality or bit rate level substantially equal to or lower than the quality or bit rate of the chunk having the start aligned with the start of the chunk, of which the sub-chunk corresponds to a sub-portion, or of the chunk having the start aligned with the end of the sub-chunk or of the following sub-chunk.

In an embodiment, the video processing device is configured to downsample the resolution of the encoded video data of the sub-chunk.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

FIG. 20 illustrates a particular hardware implementation of the video processing device 100. In an embodiment, the video processing device comprises a memory manager 110 configured to store the chunks. The video processing device 100 also comprises a decoder 120 configured to decode the encoded video data. The memory manager 110 is also configured to discard the selected portion of the stored chunks or discard the selected sub-chunks as described herein.

In an embodiment, the video processing device 100 also comprises a memory 140 in which the memory manager 110 stores the chunks and from which the memory manager 110 discards selected chunks or sub-chunks while keeping selected chunks or sub-chunks stored as navigation tune-in points.

The figure also illustrates an optional communication circuitry 130. This communication circuitry 130 is preferably configured to receive encoded video data of the streamed video bitstream and also request, following a tune-in request, encoded video data of a chunk or sub-chunk.

The communication circuitry 130 is preferably connected to the memory manager 110 for forwarding received encoded video data to the memory manager 110 to thereby be stored in the memory 140 connected to the memory manager 110. The decoder 120 is preferably connected to the memory 140 in order to access and decoded encoded video data. Alternatively, the memory manager 110 provides this encoded video data to the decoder 120 from the memory 140.

The communication circuitry 130 could be implemented to have both transmitter and receiver functionality, such as in the form of a transceiver or a transmitter and receiver pair adapted for wireless transmission and reception of data. In an alternative approach, the communication circuitry 130 could be in the form of an input and output (I/O) unit configured for wired communication of data.

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

In a particular example, the video processing device 200, see FIG. 21, comprises a processor 210 and a memory 220 comprising instructions executable by the processor 210. The processor 210 is operative to store the chunks in the memory 220 as described herein. The processor 210 is also operative to decode the encoded video data as described herein. The processor 210 is further configured to discard the selected portion of the stored chunks or the selected sub-chunks from the memory 220 as described herein.

In a particular embodiment, the processor 210 is operative, when executing the instructions stored in the memory 220, to perform the above described operations. The processor 210 is thereby interconnected to the memory 220 to enable normal software execution.

In an embodiment, the video processing device 200 also comprises a communication circuitry 230 configured to receive the encoded video data of the streamed video bitstream. The communication circuitry 230 is also configured to request and receive a chunk or sub-chunks of encoded video data following reception of a video tune-in request.

The communication circuitry 230 could be implemented to have both transmitter and receiver functionality, such as in the form of a transceiver or a transmitter and receiver pair adapted for wireless transmission and reception of data. In an alternative approach, the communication circuitry 230 could be in the form of an input and output (I/O) unit configured for wired communication of data.

Figure 23:
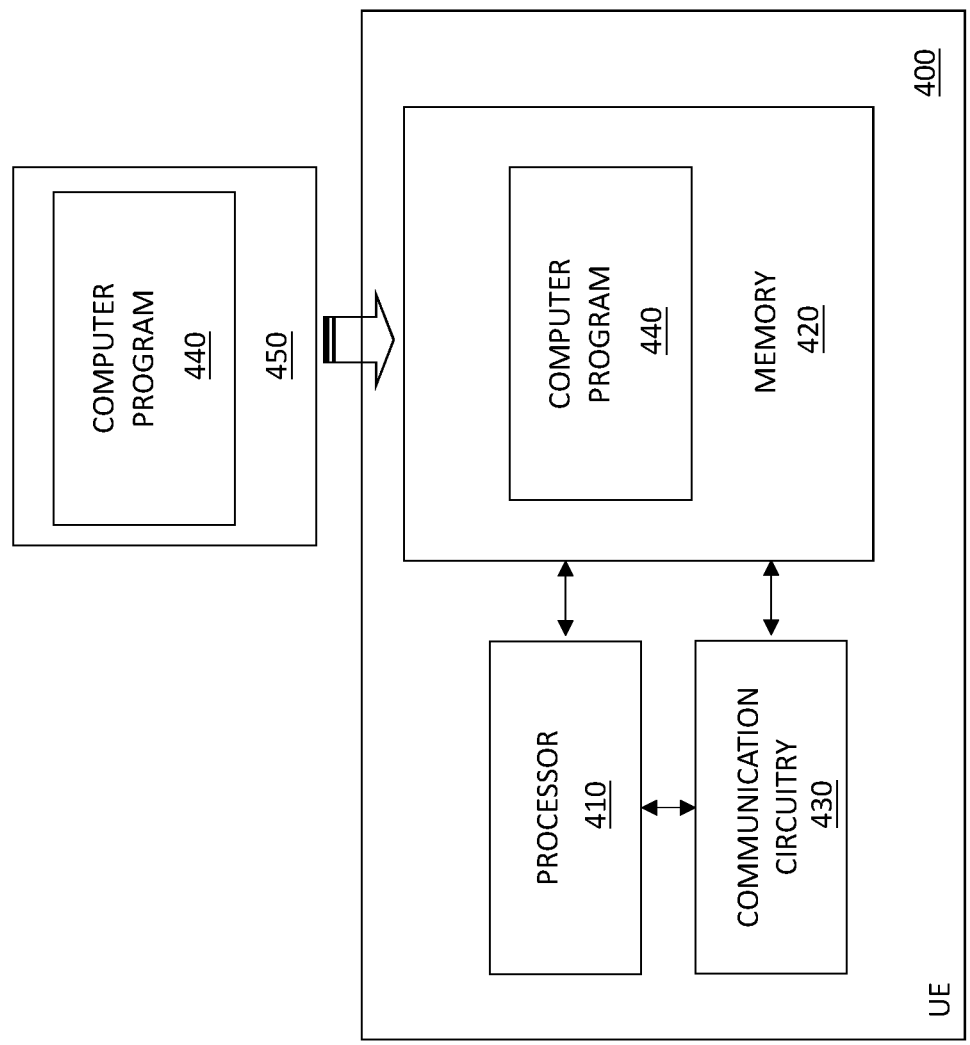
FIG. 23 schematically illustrates a user equipment (UE) according to an embodiment.

FIG. 23 is a schematic block diagram illustrating an example of a user equipment (UE) 400 comprising a processor 410, an associated memory 420 and a communication circuitry 430.

In this particular example, at least some of the steps, functions, procedures, modules and/or blocks described herein are implemented in a computer program 440, which is loaded into the memory 420 for execution by processing circuitry including one or more processors 410. The processor 410 and memory 420 are interconnected to each other to enable normal software execution. A communication circuitry 430 is also interconnected to the processor 410 and/or the memory 420 to enable input and/or output of video data and requests for video data.

The user equipment 400 can be any device or apparatus that can receive and request encoded video data of a streamed video bitstream. For instance, the user equipment 400 could be a computer, either stationary or portable, such as laptop, a smart phone, a tablet, a set-top box, etc.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In an embodiment, the computer program 440 comprises instructions, which when executed by the processor 410, cause the processor 410 to store chunks of encoded video data of a streamed video bitstream partitioned into multiple chunks. Each chunk of the multiple chunks starts with an independently decodable picture. The processor 410 is also caused to decode encoded video data of the streamed video bitstream to form decoded video data to be output for display. The processor 410 is further caused to discard a selected portion of the stored chunks for a previous, already played out part of the streamed video bitstream while keeping selected stored chunks for the previous, already played out part of the streamed video bitstream stored as output time non-adjacent navigation tune-in points distributed throughout the previous, already played out part of the streamed video bitstream.

In another embodiment, the computer program 440 comprises instructions, which when executed by the processor 410, cause the processor 410 to store chunks of encoded video data of a streamed video bitstream partitioned into multiple chunks. Each chunk of the multiple chunks starts with an independently decodable picture. The processor 410 is also caused to decode encoded video data of the streamed video bitstream to form decoded video data to be output for display. The processor 410 is further caused to discard selected sub-chunks of encoded video data of the stored chunks for a previous, already played out part of the streamed video bitstream while keeping, stored as navigation tune-in points, selected sub-chunks of encoded video for the previous, already played out part of the streamed video bitstream. Each sub-chunk corresponds to a sub-portion of a respective chunk and starts with an independently decodable picture and a play out duration of each sub-chunk is shorter than a play out duration of the respective chunks.

The proposed technology also provides a carrier 450 comprising the computer program 440. The carrier 450 is one of an electronic signal, an optical signal, an electromagnetic signal, a magnetic signal, an electric signal, a radio signal, a microwave signal, or a computer-readable storage medium 450.

By way of example, the software or computer program 440 may be realized as a computer program product, which is normally carried or stored on a computer-readable medium 440, preferably non-volatile computer-readable storage medium 450. The computer-readable medium 450 may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device. The computer program 440 may thus be loaded into the operating memory of a computer or equivalent processing device, represented by the user equipment 400 in FIG. 23, for execution by the processor 410 thereof.

The flow diagram or diagrams presented herein may therefore be regarded as a computer flow diagram or diagrams, when performed by one or more processors. A corresponding video tune-in device may be defined as a group of function modules, where each step performed by the processor corresponds to a function module. In this case, the function modules are implemented as a computer program running on the processor. Hence, the video tune-in device may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in FIG. 22.

FIG. 22 is a schematic block diagram of a video processing device 300 with function modules. The video processing device 300 comprises a memory manager 310 for storing chunks of encoded video data of a streamed video bitstream partitioned into multiple chunks. Each chunk of the multiple chunks starts with an independently decodable picture. The video processing device 300 also comprises a decoder for decoding encoded video data of the streamed video bitstream to form decoded video data to be output for display. The memory manager 310 is also for discarding a selected portion of the stored chunks for a previous, already played out part of the streamed video bitstream while keeping selected stored chunks for the previous, already played out part of the streamed video bitstream stored as output time non-adjacent navigation tune-in points distributed throughout the previous, already played out part of the streamed video bitstream.

In another embodiment, the video processing device 300 comprises a memory manager 310 for storing chunks of encoded video data of a streamed video bitstream partitioned into multiple chunks. Each chunk of the multiple chunks starts with an independently decodable picture. The video processing device 300 also comprises a decoder for decoding encoded video data of the streamed video bitstream to form decoded video data to be output for display. The memory manager 310 is also for discarding selected sub-chunks of encoded video data of the stored chunks for a previous, already played out part of the streamed video bitstream while keeping, stored as navigation tune-in points, selected sub-chunks of encoded video for the previous, already played out part of the streamed video bitstream. Each sub-chunk corresponds to a sub-portion of a respective chunk and starts with an independently decodable picture and a play out duration of each sub-chunk is shorter than a play out duration of the respective chunks.

The video processing device of the various embodiments may be implemented as a computer, either stationary or portable, such as laptop, a smart phone, a tablet, a set-top box, etc., or as a part of a computer, either stationary or portable, such as laptop, a smart phone, a tablet, a set-top box, etc.

The memory in which chunks and sub-chunks are stored in the video processing device and from which selected chunks or sub-chunks are discarded could be any memory using within the art of video decoding for storing encoded video data of a streamed video bitstream. For instance, the memory could be a fast memory, such as RAM or dynamic RAM (DRAM). It could also be possible, but generally less preferred, to store the encoded data of the chunks and sub-chunks on a hard drive.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A video processing method comprising:
   storing chunks of encoded video data of a streamed video bitstream partitioned into multiple chunks, wherein each chunk of said multiple chunks starts with an independently decodable picture;
   decoding encoded video data of said streamed video bitstream to form decoded video data to be output for display; and
   discarding a selected portion of said stored chunks for a previous, already played out part of said streamed video bitstream while keeping selected stored chunks for said previous, already played out part of said streamed video bitstream stored as output time non-adjacent navigation tune-in points distributed throughout said previous, already played out part of said streamed video bitstream.

2. The method of claim 1, wherein discarding said selected portion of said stored chunks comprises discarding at least one stored chunk for said previous, already played out part of said streamed video bitstream while keeping, as navigation tune-in point, at least one selected stored chunk preceding, according to said output time, said at least one stored chunk to be discarded and keeping, as navigation tune-in point, at least one selected stored chunk following, according to said output time, said at least one stored chunk to be discarded.

3. The method of claim 1, wherein discarding said selected portion of said stored chunks comprises discarding said selected portion of said stored chunks for said previous, already played out part of said streamed video bitstream while keeping, stored as navigation tune-in points, every Nth stored chunk for said previous, already played out part of said streamed video bitstream, wherein N is an integer equal to or larger than 2.

4. The method of claim 1, wherein discarding said selected portion of said stored chunks comprises discarding, for a pair of neighboring, according to said output time, chunks kept stored as navigation tune-in points, a number of said stored chunks having a respective output time in between said output times of said pair of neighboring chunks, said number being dependent on said output times of said pair of chunks relative to a current output time.

5. The method of claim 4, wherein said number being larger for a pair of neighboring chunks having more distant output times relative to said current output time as compared to a pair of neighboring chunks having more recent output times relative to said current output time.

6. The method of claim 1, wherein discarding said selected portion of said stored chunks comprises discarding every stored chunk for said previous, already played out part of said streamed video bitstream having an output time older than a first threshold time relative to a current output time and having an output time that is not evenly divisible by a divisor while keeping, stored as navigation tune-in points, every stored chunk for said previous, already played out part of said streamed video bitstream having an output time older than said first threshold time relative to said current output time and having an output time that is evenly divisible by said divisor.

7. The method of claim 1, wherein discarding said selected portion of said stored chunks comprises discarding every NMth stored chunk for said previous, already played out part of said streamed video bitstream having an output time older than a M times a threshold time relative to a current output time while keeping, stored as navigation tune-in points, remaining stored chunks for said previous, already played out part of said streamed video bitstream, wherein M=1 . . . Max, wherein Max is a defined integer value and Nk>Nk+1 for each k=1 . . . Max−1.

8. The method of claim 1, further comprising:
   decoding encoded video data of a chunk stored as navigation tune-in point to form decoded video data based on reception of a tune-in request specifying a tune-in position within said streamed video bitstream associated with said chunk; and
   receiving, while decoding said encoded video data of said chunk and/or playing out said decoded video data of said chunk, encoded video data of a following chunk having a start aligned with an end of said chunk.

9. The method of claim 8, wherein receiving said encoded video data comprises receiving, while decoding said encoded video data of said chunk and/or playing out said decoded video data of said chunk, encoded video data of said following chunk at a quality or bit rate that is lower than a quality or bit rate of said chunk.

10. The method of claim 9, further comprising reducing said quality or bit rate of said chunk prior to playing out said decoded video data of said chunk.

11. The method of claim 10, wherein reducing said quality or bit rate of said chunk comprises reducing said quality or bit rate of said chunk to a quality or bit rate level substantially equal to or lower than said quality or bit rate of said following chunk.

12. The method of claim 10, wherein reducing said quality or bit rate of said chunk comprises downsampling the resolution of said encoded video data of said chunk.

13. A video processing method comprising:
   storing chunks of encoded video data of a streamed video bitstream partitioned into multiple chunks, wherein each chunk of said multiple chunks starts with an independently decodable picture;
   decoding encoded video data of said streamed video bitstream to form decoded video data to be output for display; and
   discarding selected sub-chunks of encoded video data of said stored chunks for a previous, already played out part of said streamed video bitstream while keeping, stored as navigation tune-in points, selected sub-chunks of encoded video data for said previous, already played out part of said streamed video bitstream, each sub-chunk corresponds to a sub-portion of a chunk and starts with an independently decodable picture and a play out duration of each sub-chunk is shorter than a play out duration of said chunks.

14. The method of claim 13, wherein discarding said selected sub-chunks comprises discarding said selected sub-chunks while keeping, stored as navigation tune-in points, sub-chunks corresponding to a first sub-portion or a last sub-portion of said chunks.

15. The method of claim 13, wherein discarding said sub-chunks comprises:
   discarding M1 sub-chunks out of N sub-chunks for a first chunk in said previous, already played out part of said streamed video bitstream while keeping N-M1 sub-chunks of said first chunk stored as navigation tune-in points; and
   discarding M2 sub-chunks out of N sub-chunks for a second chunk in said previous, already played out part of said streamed video bitstream while keeping N-M2 sub-chunks of said second chunk stored as navigation tune-in points, wherein M2>M1 and said second chunk having an older play out time as compared to said first chunk relative to a current play out time.

16. The method of claim 13, further comprising:
decoding encoded video data of a sub-chunk stored as navigation tune-in point to form decoded video data based on reception of a tune-in request specifying a tune-in position within said streamed video bitstream associated with said sub-chunk; and
receiving, while decoding said encoded video data of said sub-chunk and/or playing out said decoded video data of said sub-chunk, encoded video data of a chunk having a start aligned with a start of a chunk, of which said sub-chunk is a sub-portion, or of a chunk or of a following sub-chunk having a start aligned with an end of said sub-chunk.

17. The method of claim 16, wherein receiving said encoded video data comprises receiving, while decoding said encoded video data of said sub-chunk and/or playing out said decoded video data of said sub-chunk, encoded video data of said chunk having said start aligned with said start of said chunk, of which said sub-chunk is a sub-portion, or of said chunk having said start aligned with said end of said sub-chunk or of said following sub-chunk at a quality or bit rate that is lower than a quality or bit rate of said sub-chunk.

18. The method of claim 17, further comprising reducing said quality or bit rate of said sub-chunk prior to playing out said decoded video data of said sub-chunk.

19. The method of claim 18, wherein reducing said quality or bit rate of said sub-chunk comprises reducing said quality or bit rate of said sub-chunk to quality or bit rate level substantially equal to or lower than said quality or bit rate of said chunk having said start aligned with said start of said chunk, of which said sub-chunk corresponds to a sub-portion, or of said chunk having said start aligned with said end of said sub-chunk or of said following sub-chunk.

20. The method of claim 18, wherein reducing said quality or bit rate of said sub-chunk comprises downsampling the resolution of said encoded video data of said sub-chunk.

21. A video processing device, wherein
said video processing device is configured to store chunks of encoded video data of a streamed video bitstream partitioned into multiple chunks, each chunk of said multiple chunks starts with an independently decodable picture;
said video processing device is configured to decode encoded video data of said streamed video bitstream to form decoded video data to be output for display; and
said video processing device is configured to discard a selected portion of said stored chunks for a previous, already played out part of said streamed video bitstream while keeping selected stored chunks for said previous, already played out part of said streamed video bitstream stored as output time non-adjacent navigation tune-in points distributed throughout said previous, already played out part of said streamed video bitstream.

22. The video processing device of claim 21, wherein said video processing device is configured to discard said selected portion of said stored chunk for said previous, already played out part of said streamed video bitstream while keeping, stored as navigation tune-in points, every Nth stored chunk for said previous, already played out part of said streamed video bitstream, wherein N is an integer equal to or larger than 2.

23. The video processing device of claim 21, wherein said video processing device is configured to discard, for a pair of neighboring, according to said output time, chunks kept stored as navigation tune-in points, a number of said stored chunks having a respective output time in between said output times of said pair of neighboring chunks, said number being dependent on output times of said pair of chunks relative to a current output time.

24. The video processing device of claim 21, wherein said video processing device is configured to discard every stored chunk for said previous, already played out part of said streamed video bitstream having an output time older than a first threshold time relative to a current output time and having an output time that is not evenly divisible by a divisor while keeping, stored as navigation tune-in points, every stored chunk for said previous, already played out part of said streamed video bitstream having an output time older than said first threshold time relative to said current output time and having an output time that is evenly divisible by said divisor.

25. The video processing device of claim 21, wherein said video processing device is configured to discard every Mth stored chunk for said previous, already played out part of said streamed video bitstream having an output time older than a multiple of a threshold time relative to a current output time while keeping, stored as navigation tune-in points, remaining stored chunks for said previous, already played out part of said streamed video bitstream.

26. The video processing device of claim 21, wherein
said video processing device is configured to decode encoded video data of a chunk stored as navigation tune-in point to form decoded video data based on reception of a tune-in request specifying a tune-in position within said streamed video bitstream associated with said chunk; and
said video processing device is configured to receive, while decoding said encoded video data of said chunk and/or playing out said decoded video data of said chunk, encoded video data of a following chunk having a start aligned with an end of said chunk.

27. The video processing device of claim 26, wherein said video processing device is configured to receive, while decoding said encoded video data of said chunk and/or playing out said decoded video data of said chunk, encoded video data of said following chunk at a quality or bit rate that is lower than a quality or bit rate of said chunk.

28. The video processing device of claim 27, wherein said video processing device is configured to reduce said quality or bit rate of said chunk prior to playing out said decoded video data of said chunk.

29. The video processing device of claim 28, wherein said video processing device is configured to downsample the resolution of said encoded video data of said chunk.

30. A video processing device, wherein
said video processing device is configured to store chunks of encoded video data of a streamed video bitstream partitioned into multiple chunks, each chunk of said multiple chunks starts with an independently decodable picture;
said video processing device is configured to decode encoded video data of said streamed video bitstream to form decoded video data to be output for display; and
said video processing device is configured to discard selected sub-chunks of encoded video data of said stored chunks for a previous, already played out part of said streamed video bitstream while keeping, stored as navigation tune-in points, selected sub-chunks of encoded video data for said previous, already played out part of said streamed video bitstream, each sub-chunk corresponds to a sub-portion of a chunk and starts with an independently decodable picture and a play out duration of each sub-chunk is shorter than a play out duration of said chunks.

31. The video processing device of claim 30, wherein
said video processing device is configured to discard M1 sub-chunks out of N sub-chunks for a first chunk in said previous, already played out part of said streamed video bitstream while keeping N-M1 sub-chunks of said first chunk stored as navigation tune-in points; and
said video processing device is configured to discard M2 sub-chunks out of N sub-chunks for a second chunk in said previous, already played out part of said streamed video bitstream while keeping N-M2 sub-chunks of said second chunk stored as navigation tune-in points, wherein M2>M1 and said second chunk having an older play out time as compared to said first chunk relative to a current play out time.

32. The video processing device of claim 30, wherein
said video processing device is configured to decode encoded video data of a sub-chunk stored as navigation tune-in point to form decoded video data based on reception of a tune-in request specifying a tune-in position within said streamed video bitstream associated with said sub-chunk; and
said video processing device is configured to receive, while decoding said encoded video data of said sub-chunk and/or playing out said decoded video data of said sub-chunk, encoded video data of a chunk having a start aligned with a start of a chunk, of which said sub-chunk corresponds to a sub-portion, or of a chunk or of a following sub-chunk having a start aligned with an end of said sub-chunk.

33. The video processing device of claim 32, wherein said video processing device is configured to receive, while decoding said encoded video data of said sub-chunk and/or playing out said decoded video data of said sub-chunk, encoded video data of said chunk having said start aligned with said start of said chunk, of which said sub-chunk corresponds to a sub-portion, or of said chunk having said start aligned with said end of said sub-chunk or of said following sub-chunk at a quality or bit rate that is lower than a quality or bit rate of said sub-chunk.

34. The video processing device of claim 33, wherein video processing device is configured to reduce said quality or bit rate of said sub-chunk prior to playing out said decoded video data of said sub-chunk.

35. The video processing device of claim 34, wherein said video processing device is configured to reduce said quality or bit rate of said sub-chunk to quality or bit rate level substantially equal to or lower than said quality or bit rate of said chunk having said start aligned with said start of said chunk, of which said sub-chunk corresponds to a sub-portion, or of said chunk having said start aligned with said end of said sub-chunk or of said following sub-chunk.

36. The video processing device of claim 34, wherein said video processing device is configured to downsample the resolution of said encoded video data of said sub-chunk.

37. The video processing device of claim 21, further comprising:
a processor; and
a memory comprising instructions executable by said processor, wherein
said processor is operative to store said chunks in said memory;
said processor is operative to decode said encoded video data; and
said processor is operative to discard said selected portion of said stored chunks or said selected sub-chunks from said memory.

38. The video processing device of claim 21, further comprising:
a memory manager configured to store said chunks; and
a decoder configured to decode said encoded video data, wherein said memory manager is further configured to discard said selected portion of said stored chunks or said selected sub-chunks.

39. A computer program product comprising a non-transitory computer readable medium storing a computer program comprising instructions which when executed by a processor cause said processor to perform the method of claim 1.

40. A computer program product comprising a non-transitory computer readable medium storing a computer program comprising instructions which when executed by a processor cause said processor to perform the method of claim 13.

* * * * *